United States Patent [19]

Furukawa et al.

[11] Patent Number: 4,467,885
[45] Date of Patent: Aug. 28, 1984

[54] VEHICULAR STEERING SYSTEM

[75] Inventors: Yoshimi Furukawa, Saitama; Shoichi Sano, Tokyo, both of Japan

[73] Assignee: Honda Giken Kogyo Kabushiki Kaisha, Tokyo, Japan

[21] Appl. No.: 402,802

[22] Filed: Jul. 28, 1982

[30] Foreign Application Priority Data

| Jul. 28, 1981 | [JP] | Japan | 56-118926 |
| Jul. 29, 1981 | [JP] | Japan | 56-118698 |
| Jul. 30, 1981 | [JP] | Japan | 56-120419 |
| Jul. 30, 1981 | [JP] | Japan | 56-120420 |
| Jul. 31, 1981 | [JP] | Japan | 56-120243 |
| Jul. 31, 1981 | [JP] | Japan | 56-120244 |
| Dec. 26, 1981 | [JP] | Japan | 56-211086 |
| Jan. 13, 1982 | [JP] | Japan | 57-003726 |
| Jan. 13, 1982 | [JP] | Japan | 57-003727 |
| Jun. 9, 1982 | [JP] | Japan | 57-098884 |
| Jun. 9, 1982 | [JP] | Japan | 57-09885 |

[51] Int. Cl.³ .......................................... B62D 5/10
[52] U.S. Cl. ............................ 180/140; 180/148; 280/91
[58] Field of Search ............... 180/140, 148, 23, 24; 280/91

[56] References Cited

U.S. PATENT DOCUMENTS 3,053,547 9/1962 Osborne ........................ 280/91 X

FOREIGN PATENT DOCUMENTS 648666 11/1962 Italy ..................................... 180/140

Primary Examiner—John A. Pekar
Attorney, Agent, or Firm—Irving M. Weiner; Pamela S. Burt; Anthony L. Cupoli

[57] ABSTRACT

A vehicular steering system which includes a steering wheel, front wheels and a steering mechanism therefor, and rear wheels and a steering mechanism therefor, the front and rear wheel steering mechanisms serving to steer both the front and rear wheels by operation of the steering wheel. The steering system is provided with a front wheel steering system connecting the steering wheel with the front wheels through the front wheel steering mechanism, a connection path connecting the front wheel steering mechanism with the rear wheel steering mechanism, a rear wheel steering system connecting the steering wheel with the rear wheels through the connection path and the rear wheel steering mechanism, and an auxiliary power mechanism connected to the connection path so as to assist steering operation of the steering wheel. The steering system provides for reduction in the steering torque appropriately in response to a resultant force of an external force acting on the front wheels from the road surface plus an external force acting on the rear wheels from the road surface at the time of steering operation for both wheels. The connection path of the system is arranged above lower vehicle members such as an exhaust pipe and a fuel tank, so that such members protect the connection path from damage.

22 Claims, 21 Drawing Figures

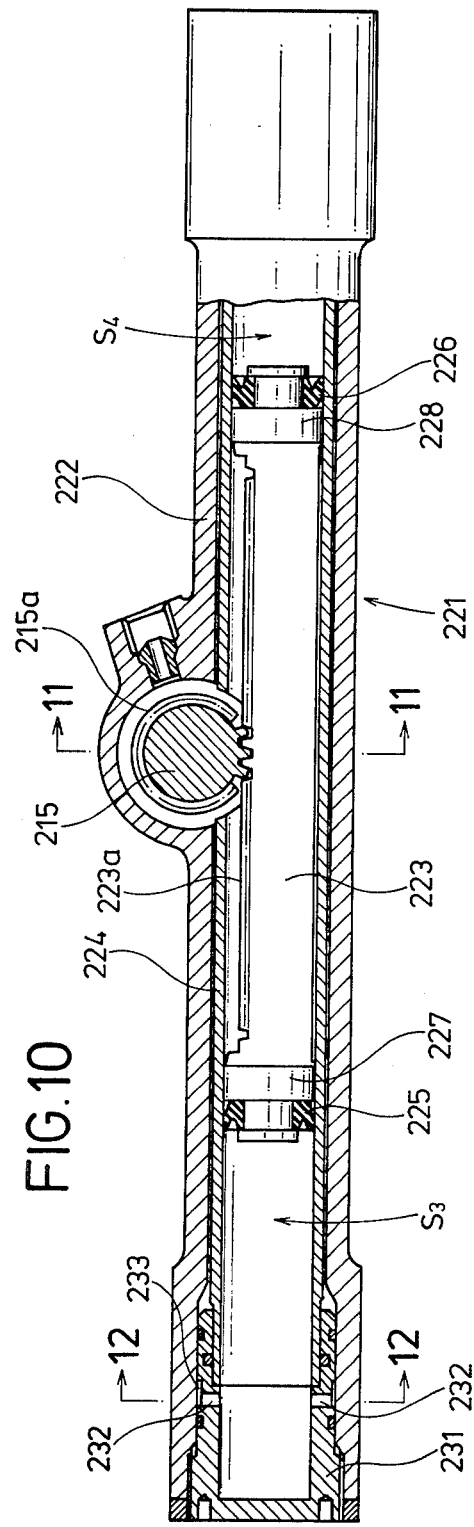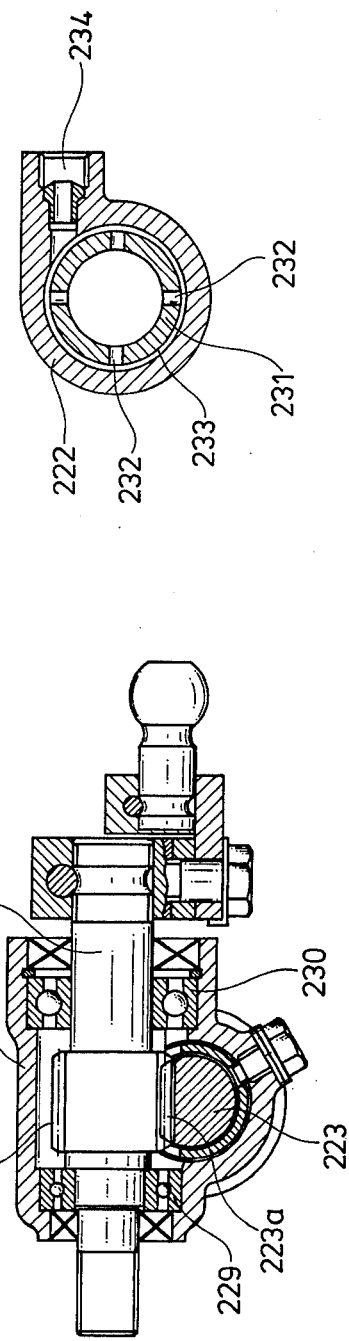

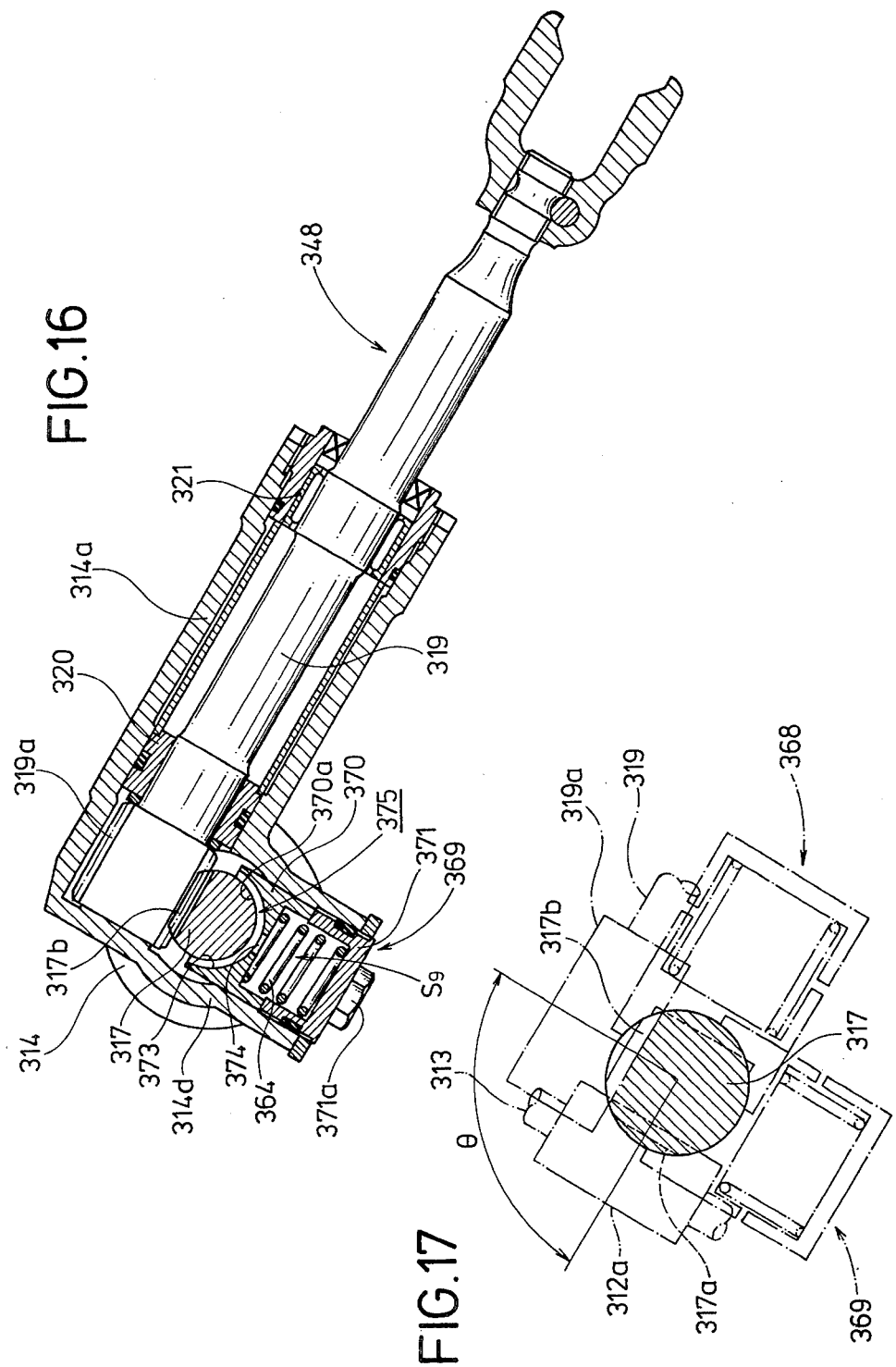

VEHICULAR STEERING SYSTEM

BACKGROUND OF THE INVENTION

1. Field of the Invention

The present invention relates to a vehicular steering system which provides for steering of both the front and rear wheels.

2. Description of Relevant Art

A vehicular steering system which provides for steering of both the front and rear wheels by operation of a steering wheel is advantageous in that the disagreement between the vehicle direction and the tangential direction of the turning locus, which occurs when only the front wheels are steered, can be eliminated and in that the difference in generation timing between a lateral force produced in the front wheels and that in the rear wheels can also be eliminated. In such a type of steering system, however, a resultant force of an external force acting on the front wheels from the road surface plus an external force acting on the rear wheels from the road surface at the time of steering operation for both wheels acts as a reaction force against the operation of a steering wheel, and consequently it becomes necessary for the vehicle driver to impart a steering torque greater than such reaction force to the steering wheel, thus resulting in a larger steering torque than that in the ordinary type of vehicles wherein only front wheels are steered. This inconvenience can be eliminated by mounting on the vehicle a power steering system equipped with an auxiliary power means such as a power cylinder for assisting the vehicle driver in operating the steering wheel. However, because the conventional power steering systems provide for steering of the front wheels only, the steering operation for the rear wheels through the steering wheel is not assisted at all. As a solution to this problem, it has been considered to provide the vehicle with a power steering system for the front wheels and one for the rear wheels separately. But if an auxiliary power means is attached to each of the front and rear wheel steering mechanisms, the number of associated parts increases substantially, thus causing inconveniences such as an increase in weight and cost of the vehicle. Such a separate provision of two auxiliary power means is further disadvantageous in that an appropriate auxiliary power according to a resultant force of an external force acting on the front wheels from the road surface plus an external force acting on the rear wheels from the road surface at the time of steering both wheels is not transmitted to the steering wheel.

For steering both front and rear wheels by operation of the steering wheel, it is necessary to adopt a structure wherein a rear wheel steering mechanism is connected to a front wheel steering mechanism to which is transmitted a steering torque of the steering wheel, and the rear wheel steering mechanism is operated along with operation of the front wheel steering mechanism to steer the rear wheels. To this end, the front and rear wheel steering mechanisms are connected through a connection path. In this case, from the standpoint of simplification of structure, it is desirable to constitute the connection path as a rectilinear path by a single shaft or the like. But such a rectilinear configuration is not desirable from the standpoint of working efficiency because the connection path projects into the interior space of the vehicle, thus making the interior space narrower, and because it becomes necessary to perform assembling and mounting operations for the connection path within the interior of the vehicle. Moreover, the connection structure between the front wheel steering mechanism and the connection path or between the connection path and the rear wheel steering mechanism must attain a smooth operation of the front or rear wheel steering mechanism. Furthermore, it is desired that such connection structure permit any desired setting of a steering angle of the rear wheels relative to the front wheels and also permit easy mounting.

Additionally, both a steering shaft which is connected to the steering wheel and the connection path are connected to the front wheel steering mechanism, and it is desirable that the connection path be connected to the front wheel steering mechanism in a position away from the steering shaft to avoid its interference with the steering shaft.

The present invention effectively overcomes the aforementioned inconveniences and drawbacks associated with the conventional vehicular steering systems.

SUMMARY OF THE INVENTION

According to the present invention, there is provided a steering system in a vehicle having a steering wheel, front wheels, a front wheel steering mechanism, rear wheels and a rear wheel steering mechanism, wherein both the front and rear wheels are steered by operation of the steering wheel. The steering system comprises a front wheel steering system which connects the steering wheel with the front wheels through the front wheel steering mechanism, a connection path which connects the front wheel steering mechanism with the rear wheel steering mechanism, a rear wheel steering system which connects the steering wheel with the rear wheels through the connection path and the rear wheel steering mechanism, and an auxiliary power means connected to the connection path for assisting the steering wheel in steering operation.

It is therefore an object of the present invention to provide a vehicular steering system whereby, with a minimum number of parts, it is possible to reduce the steering torque appropriately in response to a resultant force of an external force acting on the front wheels from the road surface plus an external force acting on the rear wheels from the road surface at the time of steering operation for both wheels.

The connection path according to the invention includes a pivotable operating shaft which extends substantially in the longitudinal direction of the vehicle body, with universal joints being attached to both end portions of the operating shaft. It is therefore another object of the present invention to provide a vehicular steering system wherein the connection path can be constructed in the form of a bent path at the universal joint portions whereby a larger interior space of the vehicle can be ensured to facilitate assembling and mounting operations for the connection path.

The connection path further includes, in addition to the pivotable operating shaft extending in the longitudinal direction of the vehicle body, a pivotable shaft connected to an end portion of the operating shaft, and to this pivotable shaft is attached a crank pin in an eccentric manner with respect to the axis of the pivotable shaft, the crank pin being connected to the rear wheel steering mechanism.

It is therefore a further object of the present invention to provide a vehicular steering system wherein the operation for connecting the pivotable shaft with the crank pin can be performed easily, the eccentric amount of the crank pin as well as the magnitude of a steering angle of the rear wheels corresponding to such eccentric amount can be determined easily and further the rear wheel steering operation can be performed smoothly.

Moreover, the connection path is disposed in an inclined manner with respect to a central line which passes through the center in the transverse direction of the vehicle body.

It is therefore another object of the present invention to prevent the steering shaft connected to the steering wheel and the connection path from interfering with each other in the front wheel steering mechanism.

Furthermore, the connection path is disposed in a position higher than that of members which are disposed on the lower portion of the vehicle body, with such members serving as protective members for the connection path.

It is therefore a still further object of the present invention to provide a vehicular steering system wherein the connection path is disposed in a position higher than that of members which are mounted on the lower portion of the vehicle body such as an exhaust pipe and a fuel tank, thereby allowing such members to serve as protective members for the connection path to ensure protection of the latter.

Preferred embodiments of the present invention will be described in detail hereinbelow with reference to the accompanying drawings, from which further features, objects and advantages of the invention will become apparent.

BRIEF DESCRIPTION OF THE DRAWINGS

FIG. 10 is a partially cutaway sectional view showing a concrete structure of a power cylinder.

FIGS. 11 and 12 are sectional views respectively taken along lines 11—11 and 12—12 of FIG. 10.

FIG. 16 is a sectional view taken along line 16—16 of FIG. 15.

FIG. 17 is a sectional side view of a piston rod of the power cylinder for the front wheels showing a positional relationship between a rack portion of the piston rod and a pinion portion which engages the rack portion.

DETAILED DESCRIPTION OF THE INVENTION

Figure 1:
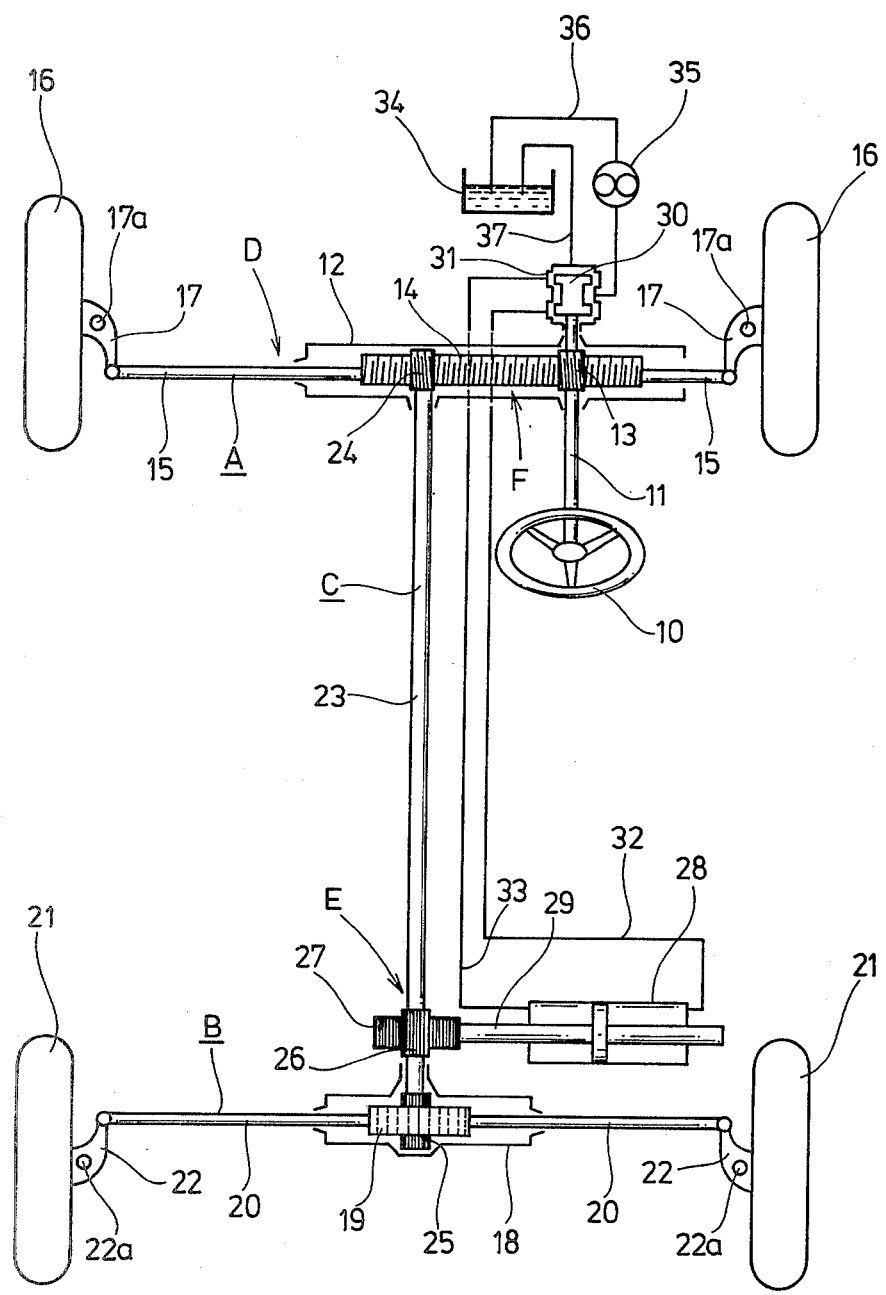
FIG. 1 is a schematic plan view of a basic structure of a vehicle according to a first embodiment of the present invention.

Referring first to FIG. 1, reference numeral 10 designates a steering wheel to be operated by the vehicle driver, and a steering shaft 11 of the steering wheel 10 extends inserted into a gear box 12, the steering shaft 11 being provided with a pinion 13. The pinion 13 engages a rack 14 which is disposed within the gear box 12 so as to be movable to the right and left. To both end portions of the rack 14 are connected inner end portions of right and left tie rods 15 for steering the front wheels, while outer end portions of the tie rods 15 are connected to knuckle arms 17 which support right and left front wheels 16 and which are pivotable to the right and left about pivot shafts 17a. When the steering wheel 10 is turned, the pinion 13 which rotates integrally with the steering shaft 11 causes the rack 14 to move in a linear motion in the right and left direction, and this motion is transmitted to the tie rods 15, so that the front wheels 16 are steered in the same direction as the operating direction of the steering wheel 10 by virtue of a pivotal movement of the knuckle arms 17. Thus, the rack 14, the right and left front wheel steering tie rods 15 and the knuckle arms 17 constitute a front wheel steering mechanism A.

At the rear portion of the vehicle, there is disposed a gear box 18 within which is mounted a rack 19 so as to be movable in the right and left directions. To both end portions of the rack 19 are connected inner end portions of right and left rear wheel steering tie rods 20. Right and left rear wheels 21 are supported by knuckle arms 22 which are pivotable to the right and left about pivot shafts 22a, and to the knuckle arms 22 are connected outer end portions of the tie rods 20. As the rack 19 moves in a linear motion in the right and left direction, this motion is transmitted to the tie rods 20, so that the rear wheels 21 are steered by virtue of a pivotal movement of the knuckle arms 22. Thus, like the front wheel steering mechanism A, a rear wheel steering mechanism B is constituted by the rack 19, the right and left rear wheel steering tie rods 20 and the knuckle arms 22.

A pivotable operating shaft 23 extends in substantially the longitudinal direction of the vehicle body, and pinions 24 and 25 are integrally mounted on the respective end portions of the operating shaft 23, the pinions 24 and 25 being in engagement with the racks 14 and 19, respectively. As a result, the front wheel steering mechanism A and the rear wheel steering mechanism B are connected through a connection path C which comprises the operating shaft 23; i.e., when the rack 14 moves in a linear motion upon operation of the steering wheel 10, the operating shaft 23 is rotated to cause a linear motion of the rack 19, so that both the front wheels 16 and the rear wheels 21 are steered. In the embodiment shown, the connection path C is constructed so that the operation ratio of the front wheel steering mechanism A to the rear wheel steering mechanism B is 1:1, i.e., the rear wheels 21 are steered at an angle equal to that of the front wheels 16. But a ratio of a steering angle of the rear wheels 21 to that of the front wheels 16, which ratio is considered to be desirable for a vehicle equipped with the steering system of the present invention, can be obtained by constructing the connection path C through a transmission system and setting the change gear ratio of the transmission system. Moreover, by connecting the rear wheel steering mechanism B and the connection path C through a cam mechanism, the steering direction and angle of the rear wheels 21 can be varied as a function of a steering angle of the steering wheel 10 relative to the steering direction and angle of the front wheels 16. Furthermore, by mounting on the vehicle a vehicle speed sensor and an actuator for actuating the rear wheel steering mechanism B in response to a signal provided from the sensor, the steering direction and angle of the rear wheels 21 can be determined as a function of a vehicle speed relative to the steering direction and angle of the front wheels 16.

A pinion 26 is integrally mounted on the operating shaft 23 and engages a rack 27. The rack 27 is connected to a piston rod 29 of a power cylinder 28 which serves as an auxiliary power means. The piston rod 29 is projected or withdrawn by an oil pressure of a hydraulic fluid which is fed selectively into two chambers partitioned by the piston of the power cylinder 28, whereby a pivoting power is imparted from the power cylinder 28 to the operating shaft 23. Thus, in the present invention, to the operating shaft 23 serving as the connection path C which connects the front wheel steering mechanism A with the rear wheel steering mechanism B there is connected the auxiliary power means comprising the power cylinder 28, and therefore auxiliary power of the auxiliary power means is transmitted to both the front wheel steering mechanism A and the rear wheel steering mechanism B through the connection path C, i.e., a single auxiliary power means carried on the vehicle for assisting the steering wheel 10 in steering operation functions for both the front and rear wheels.

For transmitting auxiliary power of the auxiliary power means to both the front wheel steering mechanism A and the rear wheel steering mechanism B, the power cylinder 28 may be connected to any position in the axial direction of the operating shaft 23. For example, the operating shaft 23 may be extended beyond the rack 14 or 19 for connection with the power cylinder 28. However, when it is taken into account that the rear wheels 21, unlike the front wheels 16, are positioned a substantial distance from the steering wheel 10 and that the operating shaft 23 is long in the longitudinal direction of the vehicle body, it is not desirable, from the standpoint of weight of the connection path and the overall vehicle weight, to connect the power cylinder 28 to the operating shaft 23, namely, the connection path C, in a position away from the rear wheel steering mechanism B, because such a connection requires an increase in mechanical rigidity of the connection path C. It is thus desirable to connect the auxiliary power means to the connection path C proximal to the rear wheel steering mechanism B.

The power cylinder 28 and a valve housing 31 within which is slidably disposed a control valve 30 for controlling the cylinder 28, are connected through oil paths 32 and 33. The valve housing 31 is also connected to an oil tank 34 through a supply oil path 36 and a return oil path 37, with an oil pump 35 being interposed in the supply oil path 36. The control valve 30 is an open center type four-way change-over valve adapted to slide back and forth in switching operation, whereby the hydraulic fluid is fed selectively into the two chambers within the power cylinder 28, thus causing the piston rod 29 to be projected or withdrawn as previously noted. The control valve 30 is integrally mounted on the fore end of the steering shaft 11. The pinion 13 mounted on the steering shaft 11 and the rack 14 which engages the pinion 13 are provided with helical teeth formed obliquely with respect to the axial direction. Therefore as the steering wheel 10 is turned, the steering shaft 11 and the control valve 30 advances or retreats somewhat according to the steering direction, whereby the control valve 30 performs the foregoing switching operation.

The control valve 30 comprises a steering torque detecting means which constitutes a power steering system together with the auxiliary power means comprising the power cylinder 28. The magnitude of a steering torque applied to the steering wheel 10 is proportional to the magnitude of a resultant force of an external force acting on the front wheels 16 from the road surface plus an external force acting on the rear wheels 21 from the road surface in the case of steering both the front and rear wheels. With this steering torque, the steering shaft 11 advances or retreats as previously noted, and the control valve 30 detects the steering torque and performs the switching operation according to the detected steering torque, so that the power cylinder 28 assists the steering wheel in steering operation.

The steering shaft 11, rack 14, front wheel steering tie rods 15 and knuckle arms 17 constitute a front wheel steering system D which connects the steering wheel 10 with the front wheels 16. On the other hand, the steering shaft 11, rack 14, operating shaft 23, rack 19, rear wheel steering tie rods 20 and knuckle arms 22 constitute a rear wheel steering system E which connects the steering wheel 10 with the rear wheels 21. The steering shaft 11 and the rack 14, which are common to both the front wheel steering system D and the rear wheel steering system E, form a common path F. The steering torque detecting control valve 30 is attached to the steering shaft 11, i.e., steering torque detecting means is disposed in the common path F. Both an external force acting on the front wheels from the road surface and an external force acting on the rear wheels from the road surface at the time of steering operation for the front and rear wheels gather in the common path F, and therefore a steering torque having a magnitude proportional to the resultant force of such external forces can be detected by the detecting means. Consequently, the auxiliary power of the auxiliary power means is provided for the steering of both the front and rear wheels, i.e., the steering operation for the steering wheel 10 can be preformed while being reduced in required power for both the front and rear wheels.

The common path F includes the rack 14, and with the rack 14 which extends to the front wheels 16 side is engaged the pinion 24 which constitutes a part of the rear wheel steering system E in addition to the pinion 13 which pivots integrally with the steering wheel 10. Therefore, the structure of the common path F can be simplified in the portion of the rack 14.

According to this embodiment, as will be apparent from the foregoing description, because the auxiliary power means is connected to the connection path for the front and rear steering mechanisms, auxiliary power therefrom can be transmitted to both the front and rear steering mechanisms, i.e., a single auxiliary power means can its function for both the front and rear wheels. Moreover, because the auxiliary power means is connected to the connection path in proximity to the rear wheel steering mechanism, the weight of the connection path can be reduced from the aspect of rigidity and hence the weight of the vehicle body can be reduced. Furthermore, there is formed a path common to both the front and rear wheel steering systems, and a steering torque detecting means is disposed in such common path where there accumulates an external force acting on the front wheels from the road surface and an external force acting on the rear wheels from the road surface, and therefore a steering torque proportional to such resultant force of these external forces can be detected. Thus, the detecting means can operate for both the front and rear wheels, and the steering torque required for steering both the front and rear wheels can be decreased.

Figure 2:
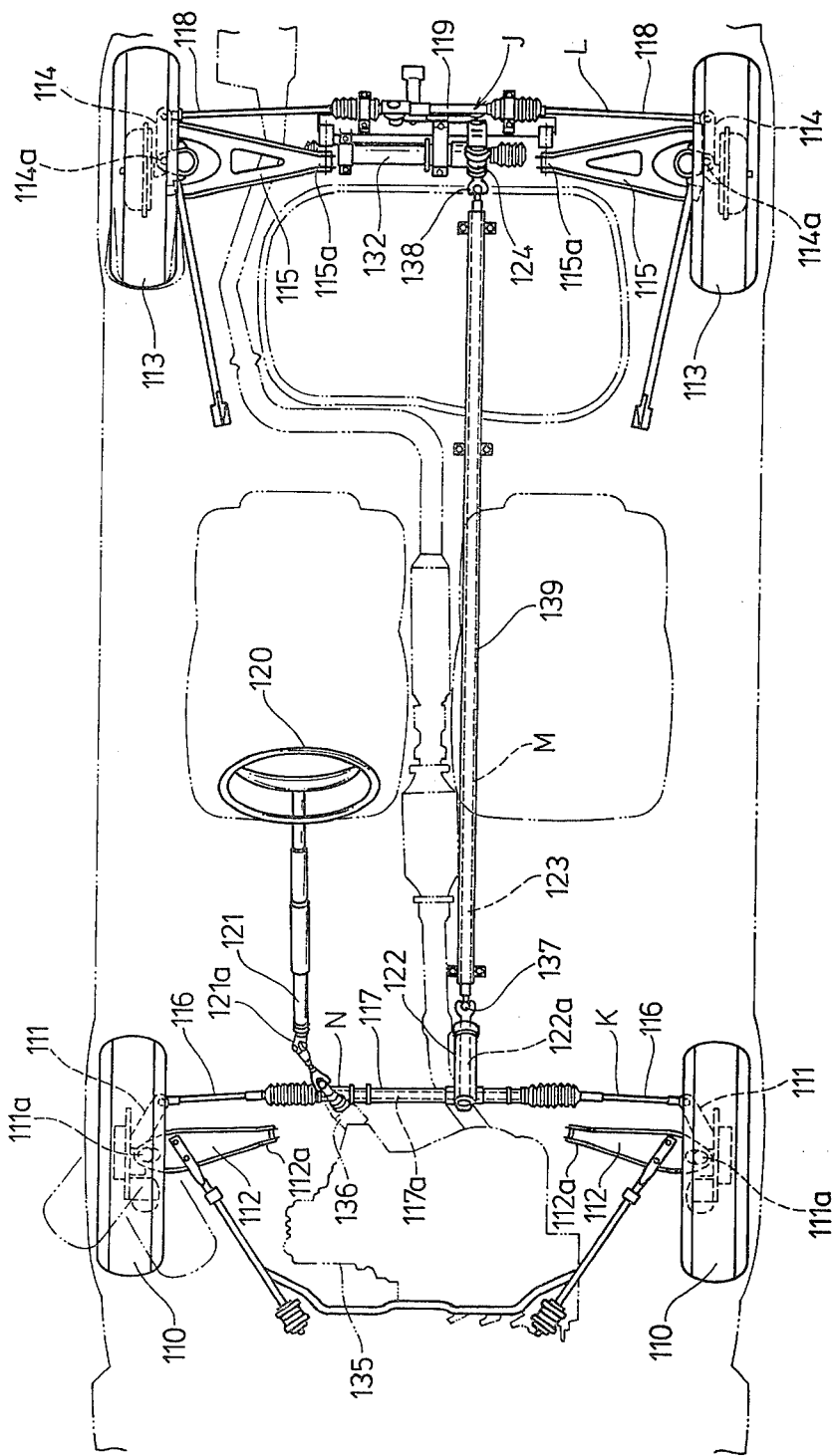
FIG. 2 is an overall plan view of the vehicle concretely showing the structure of principal members in FIG. 1.

Referring now to FIG. 2, right and left front wheels 110 are supported by knuckle arms 111 which are pivotable to the right and left about shafts 111a. The knuckle arms 111 are each supported by the vehicle body through a shock absorber having the upper end thereof secured to the vehicle body and a lower arm 112 whose inner end portion 112a is secured vertically pivotably to the vehicle body. The shock absorber and the lower arm 112 constitute a front suspension system which allows the front wheel 110 to move up and down following undulations of the road surface. On the other hand, a rear suspension system is also constructed in the same manner as the front suspension system, and it supports rear wheels 113 through knuckle arms 114 which are pivotable to the right and left about shafts 114a. The knuckle arms 114 are each supported by the vehicle body through a shock absorber having the upper end thereof secured to the vehicle body and a lower arm 115 having the inner end portion 115a thereof secured vertically pivotably to the vehicle body. To the knuckle arms 111 for the front wheels are connected outer end portions of tie rods 116, while inner end portions of the tie rods 116 are connected to both ends of a connecting rod 117a which is disposed within a gear box 117 so as to be movable to the right and left, i.e., in the transverse direction of the vehicle body. As the connecting rod 117a moves in the transverse direction, the knuckle arms 111 are pivoted in the right or left direction by the right and left front wheel steering tie rods 116, so that the front wheel 110 is steered. This front wheel steering principle is also applied to the steering operation for the rear wheels. More specifically, right and left rear wheel steering tie rods 118 are connected at the respective outer ends thereof to the rear wheel knuckle arms 114 and at the respective inner ends to both ends thereof of a connecting rod 119. As the connecting rod 119 moves in the transverse direction, the knuckle arms 114 are pivoted in the right or left direction by virtue of a tensile force or compressive force acting on the tie rods 118, so that the rear wheels 113 are steered.

A steering wheel 120 to be operated by the vehicle driver is connected with an internal mechanism of the gear box 117 through a steering shaft 121 with a universal joint interposed therein, and such internal mechanism has a direction changing function for changing a pivotal movement of the steering wheel 120 into a linear motion, in the transverse direction of the vehicle body, of the connecting rod 117a disposed within the gear box 117. By way of example, the internal mechanism is of a construction such that a pinion is integrally mounted on the fore end of the steering shaft 121 which extends into the interior of the gear box 117, while the connecting rod 117a is allowed to function as a rack meshing with the pinion. Through this internal structure, the front wheels 110 are steered upon operation of the steering wheel 120.

Figure 5:
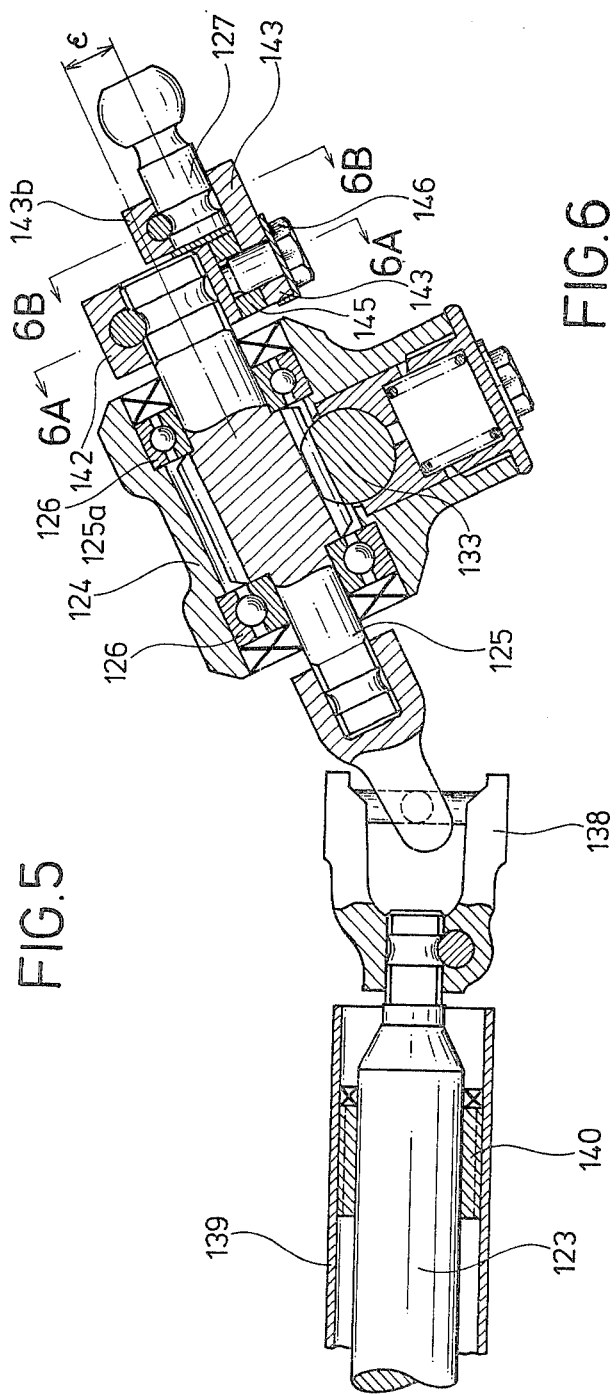
FIG. 5 is a partially enlarged sectional side view of FIG. 4.

A case 122 is connected to the gear box 117 in a position biased in the transverse direction from the connection with the steering shaft 121, and in the interior of the case 122 is inserted a connecting shaft 122a which connects with the internal mechanism of the gear box 117. The connecting shaft 122a pivots along with a linear motion of the connecting rod 117a in the transverse direction of the vehicle body. To realize this operation, if the connecting rod 117a serves as a rack as mentioned above, a pinion which engages the rack may be formed on the connecting shaft 122a. To the rear end of the connecting shaft 122a which extends from the gear box 117 toward the rear of the vehicle body is connected the fore end of an operating shaft 123 which extends in the longitudinal direction of the vehicle body. The rear end of the operating shaft 123 disposed between front and rear portions of the vehicle body is connected to the fore end of a pivotable shaft 125 which is inserted in a case 124. As shown in FIG. 5, the pivotable shaft 125 is pivotably supported by bearings 126 within the case 124. When the steering wheel 120 is turned, the pivotable shaft 125 pivots in operative cooperation with the steering wheel 120 through connecting rod 117a, connecting shaft 122a and operating shaft 123, so that a pivoting force of the pivotal shaft 125, which extends in the longitudinal direction of the vehicle body although it has a vertical inclination angle serves as a steering force for the rear wheels 113.

Figure 7:
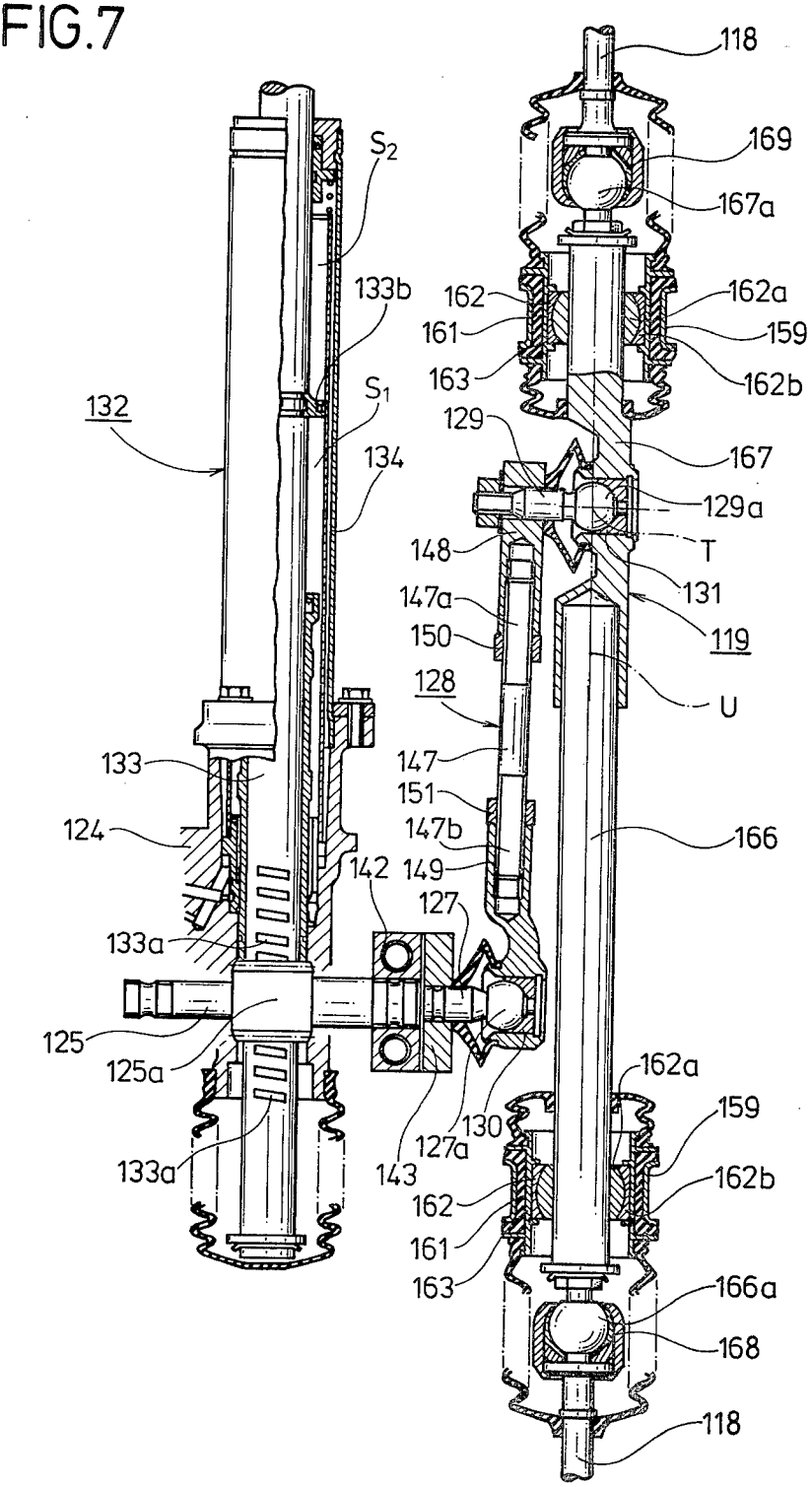
FIG. 7 is a sectional plan view of a power cylinder, a crank mechanism and the rear wheel steering mechanism which are disposed at the rear portion of the vehicle body.

At the rear end of the pivotable shaft 125 is disposed a crank pin 127 which projects in the rearward direction of the vehicle body. The crank pin 127 is substantially parallel to the pivotable shaft 125, but is biased by an amount of $\epsilon$ radially from the axis of the pivotable shaft 125. To the rear end of the crank pin 127 is connected one end of a connecting rod 128 as shown in FIG. 7, while to the other end of the connecting rod 128 which extends in the transverse direction of the vehicle body is connected a connecting pin 129 which extends in the rearward direction of the vehicle body. Through the connecting pin 129 the connecting rod 128 and the connecting rod 119 which connects between the right and left rear wheel steering tie rods 118 are connected. The connection between the crank pin 127 and the connecting rod 128 is effected in such a manner that a ball portion 127a formed at the rear end of the crank pin 127 is slidably held by a ball receiving member 130 mounted in one end of the connecting rod 128. The connection between the connecting pin 129 and the connecting rod 119 is also effected in the same way, i.e., a ball portion 129a formed at the rear end of the connecting pin 129 is slidably held by a ball receiving member 131 mounted in the connecting rod 119.

The pivotable shaft 125, crank pin 127, connecting rod 128 and connecting pin 129 constitute a crank mechanism J, wherein a pivotal movement of the pivotable shaft 125 causes the crank pin 127 to pivot in an arcuate locus about the axis of the pivotable shaft 125, so that the connecting rod 119 moves linearly in the transverse direction of the vehicle body by virtue of a tensile force or compressive force of the connecting rod 128, whereby the rear wheels 113 are steered.

As will be apparent from the foregoing description, a front wheel steering mechanism K is defined by the front wheel knuckle arms 111, right and left front wheel steering tie rods 116 and connecting rod 117a interposed between the tie rods 116, while a rear wheel steering mechanism L is constituted by the rear wheel knuckle arms 114, right and left rear wheel steering tie rods 118 and connecting rod 119 interposed between the tie rods 118. The front wheel steering mechanism K and the rear wheel steering mechanism L are connected through a connection path M, the connection path M comprising the connecting shaft 122a, the operating shaft 123 and the pivotable shaft 125 which also serves as a component of the crank mechanism J. When the steering wheel 120 is turned, the front wheel steering operation of the front wheel steering mechanism K involving linear movement of the connecting rod 117a in the transverse direction of the vehicle body is transmitted to the rear wheel steering mechanism L through the crank mechanism J as a rear wheel steering operation which comprises a linear movement of the connecting rod 119 in the transverse direction of the vehicle body, so that the rear wheels 113 are steered together with the front wheels 110 in response to the steering operation of the steering wheel 120. Because the rear wheel steering operation of the rear wheel steering mechanism L is effected by a pivoting force of the pivotal shaft 125 through the connecting shaft 122a and the operating shaft 123, the pivotable shaft 125 serves as an input shaft for transmitting a rear wheel steering force to the rear wheel steering mechanism L.

The distance of linear movement of the connecting rod 119 relative to the pivotal angle of the input shaft 125 can be determined as desired by interposing a speed change means having a desired change gear ratio such as gearing between the front wheel steering mechanism K and the connection path M and further in the connection path M.

Figure 3:
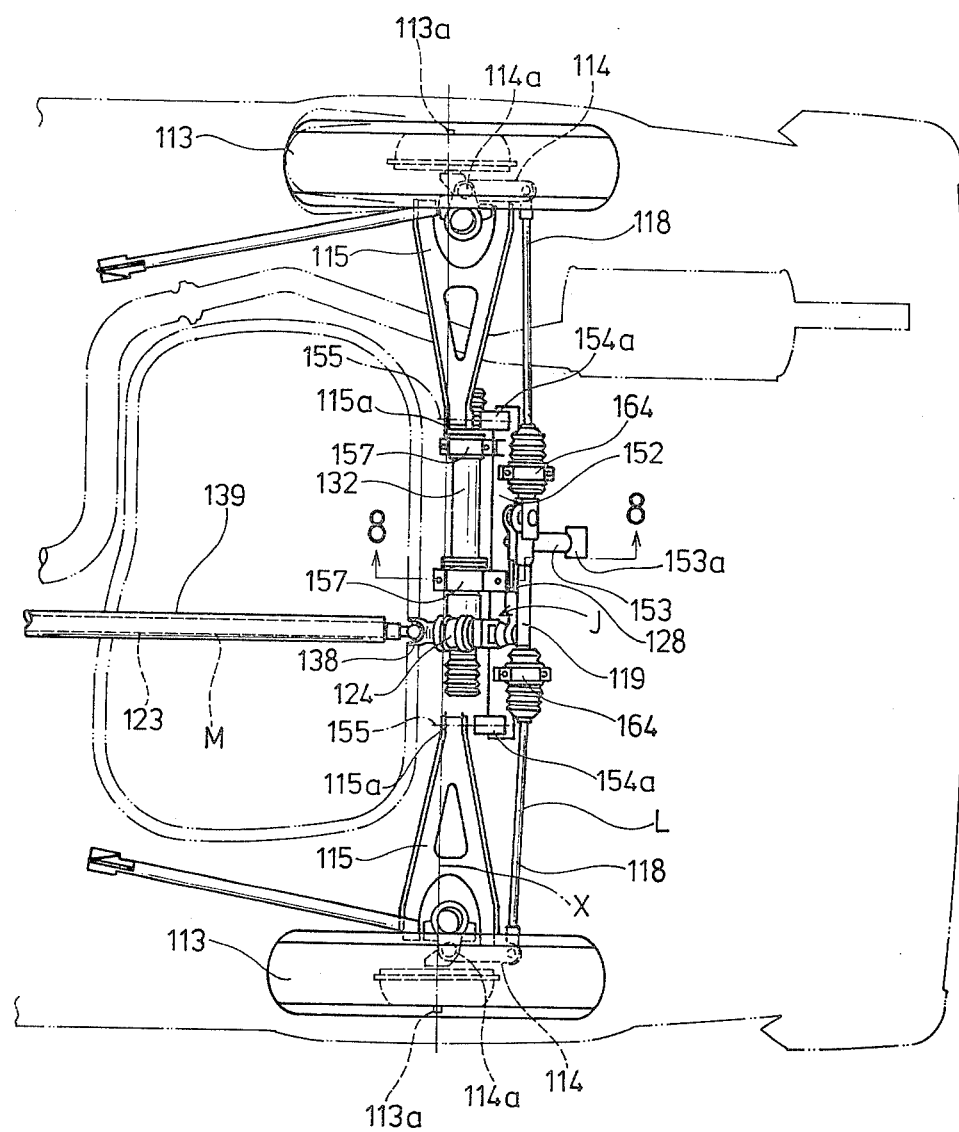
FIG. 3 is a partially enlarged view of FIG. 2 showing a rear portion of the vehicle body.

A power steering system for assisting the vehicle driver in operating the steering wheel 120 is mounted on the vehicle, and includes a power cylinder 132 as shown in FIGS. 2, 3 and 7. The power cylinder 132 comprises an auxiliary power means, and as shown in FIG. 7, a piston rod 133 which is slidable in the transverse direction of the vehicle body is inserted in the cylinder 132, and a cylinder barrel 134 of the cylinder 132 is integrally combined with the case 124 of the pivotable shaft 125, thus attaining a compact structure. The piston rod 133 serves as a rack having teeth 133a which are engaged with a pinion 125a formed integrally with the pivotable shaft 125. Hydraulic fluid is fed selectively to either one of right and left hydraulic fluid feed chambers $S_1$ and $S_2$ in the cylinder barrel 134 partitioned by a piston portion 133b of the piston rod 133, whereby the piston rod 133 advances or withdraws and consequently an auxiliary pivoting power is imparted to the pivotable shaft 125 from the power cylinder 132.

The pivotable shaft 125 is a component of the connection path M and also communicates also with the front wheel steering mechanism K through the operating shaft 123 and connecting shaft 122a, and therefore the auxiliary power from the power cylinder 132 is transmitted to both the front wheel steering mechanism K and the rear wheel steering mechanism L. Thus, the steering operation for the steering wheel 120 for steering both the front wheel 110 and rear wheel 113 can be assisted by a single auxiliary power means which functions for both the front and rear wheels. Consequently, despite steering of both the front wheel 110 and rear wheel 113, the steering wheel 120 can be operated easily.

Such assistance for the steering wheel 120 can be attained even if the power cylinder is disposed at the front portion of the vehicle body and connected to the connecting shaft 122a or the operating shaft 123. However, as shown, the power cylinder 132 is desirably disposed at the rear portion of the vehicle body, for the following reasons. The front portion of the vehicle body provides only limited space because an engine 135, etc. is disposed therein, while the rear portion thereof has a relatively sufficient space, and the rear wheel steering mechanism L is positioned farther from the steering wheel 120 than the front wheel steering mechanism K. Thus, if the power cylinder 132 is disposed at the front portion of the vehicle, it becomes necessary to increase the mechanical rigidity of the connection path M for transmitting auxiliary power to the rear wheel steering mechanism L, thus resulting in increased vehicle weight, while if the power cylinder 132 is disposed at the rear portion of the vehicle body, such a problem does not arise and the vehicle weight can be reduced. Furthermore, as shown in FIG. 3, the power cylinder 132, the right and left rear wheel steering tie rods 118 and the connecting rod 119 are disposed behind line X connecting right and left rear wheel axles 113a which support the rear wheels 113, and this position behind the line X leaves ample space at the rear part of the vehicle body, so it is possible to utilize space effectively in arranging the power cylinder 132, etc.

The right and left hydraulic fluid feed chambers $S_1$ and $S_2$ of the power cylinder 132 are connected to an oil tank (not shown) through a hydraulic circuit, and in such hydraulic circuit is included a control valve for controlling the operation of the power cylinder 132 by supplying hydraulic fluid selectively to the right and left hydraulic fluid feed chambers $S_1$ and $S_2$. This control valve, together with the power cylinder 132, constitutes the foregoing power steering system, and also serves as a detecting means for detecting a steering torque applied to the steering wheel 120. In this embodiment, the control valve is attached to the fore end of the steering shaft 121 shown in FIG. 2 and is accommodated slidably within a valve housing 136. Thus, the power cylinder and the control valve are separately mounted on the vehicle body. For the switching operation of the control valve to supply hydraulic fluid selectively to the right and left hydraulic fluid feed chambers $S_1$ and $S_2$, the pinion formed on the steering shaft 121 and the connecting rod 117a provided with a rack which engages the pinion both have helical teeth which are oblique with respect to the axial direction, and by virtue of an axial thrust induced by such helical teeth upon turning of the steering wheel 120 the control valve slides in switching operation within the valve housing 136. Because the control valve slides according to the magnitude of a steering torque applied to the steering wheel 120, the magnitude of auxiliary power transmitted from the power cylinder 132 to the front wheel steering mechanism K and the rear wheel steering mechanism L is proportional to the steering torque.

The steering wheel 120 and the front wheels 110 are connected through a front wheel steering system comprising the steering shaft 121, connecting rod 117a, front wheel steering tie rods 116 and knuckle arms 111, while the steering wheel 120 and the rear wheels 113 are connected through a rear wheel steering system comprising the steering shaft 121, connecting rod 117a, connection path M, crank mechanism J, connecting rod 119, rear wheel steering tie rods 118 and knuckle arms 114. When the front wheels 110 and the rear wheels 113 are steered, an external force acting on the front wheels 110 from the road surface and that acting on the rear wheels 113 are transmitted to the steering wheel 120 through the front wheel steering system and the rear wheel steering system, respectively, i.e., the magnitude of a steering torque to be applied to the steering wheel 120 corresponds to a resultant force of such external forces. In this case, the resultant force of the external force acting on the front wheels and that on the rear wheels is detected by the control valve because the control valve serving as a steering torque detecting means is mounted on the steering shaft 121 which constitutes a common path N as the junction of the front wheel steering system and the rear wheel steering system. Thus, the auxiliary power from the power cylinder 132 can be utilized for both the front wheels 110 and the rear wheels 113.

Figure 4:
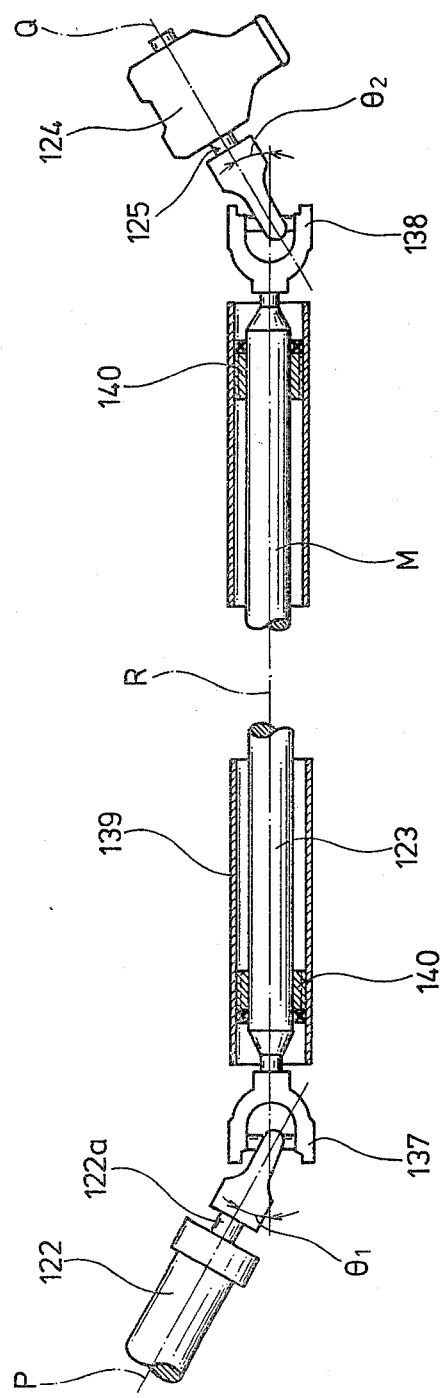
FIG. 4 is a side view of a connection path which connects a front wheel steering mechanism with a rear wheel steering mechanism.

As shown in FIG. 4, the connecting shaft 122a as a component of the connection path M is inclined rearwardly downward, while the pivotable shaft 125 is inclined rearwardly upward, and such shafts 122a and 125 are connected with the operating shaft 123 through universal joints 137 and 138. Thus, by attaching the universal joints 137 and 138 to both end portions of the operating shaft 123, it is no longer necessary to dispose the operating shaft 123 at the same height as the front wheel steering mechanism K and the rear wheel steering mechanism L. Because the connection path M including the operating shaft 123 is in the form of a bent path wherein the universal joints 137 and 138 are bent portions, the operating shaft 123 can be extended below the floor constituting members of the vehicle and outside the interior of the vehicle, whereby a larger interior space can be ensured and the assembling and mounting operations for the connection path M can be performed more easily and satisfactorily. Furthermore, by providing the universal joints 137 and 138 at both end portions of the operating shaft 123, not only can the connection path M be constructed as a bypass avoiding devices and appliances mounted on the vehicle body, but also a relative shift between the vehicular front and rear portions caused by vibration of the vehicle body during travelling, etc. can be absorbed.

In connecting the connecting shaft 122a and the pivotable shaft 125 with the operating shaft 123 through the universal joints 137 and 138, if angles $\theta_1$ and $\theta_2$ respectively of axis P of the connecting shaft 122a and axis Q of the pivotable shaft 125 with respect to axis R of the operating shaft 123 are set equal to each other, then the pivotal angular velocity of the connecting shaft 122a by operation of the front wheel steering mechanism K and that of the pivotable shaft 125 for operating the rear wheel steering mechanism L can be made equal to each other in all pivotal angular positions.

If the operating shaft 123 is disposed outside the interior of the vehicle and the connection path M is exposed to the exterior of the vehicle body as previously noted, a tubular cover member 139 is fitted over the outer periphery of the operating shaft 123 to protect the overall length of the operating shaft 123 against adverse external conditions such as striking of pebbles and splash of mud. The cover member 139 is attached to the lower surface of the floor constituting members through vibration absorbing members such as rubber members, and plurality of bearing bushes 140 for supporting the operating shaft 123 are fitted in the interior of the cover member 139 whereby the operating shaft 123 is prevented from undergoing deflection and the pivotal movement thereof in a state concentric with the cover member 140 can be ensured.

Figure 6:
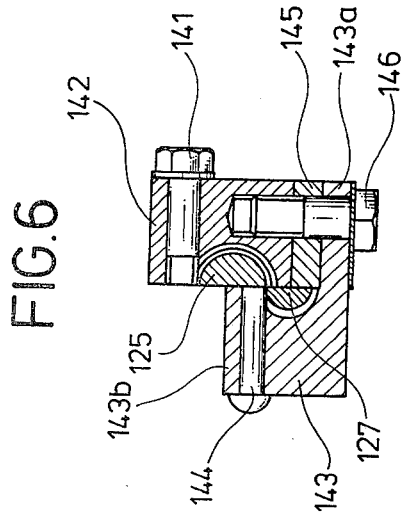
FIG. 6 is a combined view of half sectional views taken along lines 6A—6A and 6B—6B of FIG. 5.

When the rear wheels 113 are steered by crank motion of the crank mechanism J, the magnitude of a steering angle of the rear wheels 113 depend on the moving distance of the connecting rod 119 in the transverse direction of the vehicle body, in other words, the eccentric amount $\epsilon$ of the crank pin 127 from the pivotable shaft 125 as shown in FIG. 5. In FIGS. 5 and 6 there is shown a simple structure whereby the eccentric amount $\epsilon$ can be easily set at a desired value and the crank pin 127 can be attached to the pivotable shaft 125 in a simple manner. To the rear end of the pivotable shaft 125 is secured a holding member 142 by means of a bolt 141. The crank pin 127 is secured to an arm member 143. The arm member 143, which is substantially L-shaped in side elevation, comprises a base portion 143a extending in the axial direction of the pivotable shaft 125 and an extending portion 143b which extends in the radial direction of the pivotable shaft 125 from the rear end of the base portion 143a. The crank pin 127 is secured to the extending portion 143b by means of a pin 144. A spacer member 145 having a width in the radial direction of the pivotable shaft 125 is positioned on the lower surface of the holding member 142, and further the base portion 143a of the L-shaped arm member 143 is positioned on the lower surface of the spacer member 145, then the spacer member 145 and the arm member 143 are fixed to the holding member 142 by means of a bolt 146. By tightening the bolt 146, the crank pin 127 can be secured to the pivotable shaft 125 and at the same time the eccentric amount $\epsilon$ can be set at a desired value according to the thickness of the spacer member 145. By changing the thickness of the spacer member 145, the ratio of a steering angle of the rear wheels 113 to that of the front wheels 110 can be set at a value desirable for the vehicle to which is applied the steering system of the present invention.

When the steering angle of the rear wheels 113 is zero, i.e., in a straight driving condition, the crank pin 127 is positioned just under the pivotable shaft 125 as is shown in FIGS. 5 and 6. Such a relationship between the rear wheel steering angle and the position of the crank pin can be attained at the time of assembling operation of the crank mechanism J by a structure such as shown in FIG. 7. The connecting rod 128 which connects the crank pin 127 with the connecting rod 119 is adjustable in length. More specifically, the connecting rod 128 is of a turnbuckle type comprising a screw rod 147 provided at the end portions thereof with right and left screw portions 147a and 147b, shaftlike nut members 148 and 149 which respectively are threadedly engaged with the screw portions 147a and 147b, and lock nuts 150 and 151 for clamping the screw rod 147 and the nut members 148, 149. The length of the connecting rod 128 can be changed by loosening the lock nuts 150 and 151 and rotating the screw rod 147, whereby the crank pin 127 positioned just under the pivotable shaft 125 at a zero steering angle of the rear wheels 113 when the steering angle of the front wheels 110 is zero, and the connecting rod 119 can be connected.

Furthermore, between the case where the pivotable shaft 125 is at a small pivoting angle range of 0° to 180° and the position in which it is at a large pivoting angle range of 180° to 360°, the position of the connecting rod 128 is reversed in the right and left direction with respect to its original position at a pivoting angle of the pivotable shaft 125 of 0°. Therefore, when the steering wheel 120 is turned at a small angle in the small pivoting angle range of the pivotable shaft 125, the rear wheels 113 are steered in the same direction as the front wheels 110, and when the steering wheel 120 is turned at a large angle in the large pivoting angle range of the pivotable shaft 125, the rear wheels 113 are steered in the direction opposite to the front wheels 110. Moreover, if the ratio of the steering angle of the steering wheel 120 and the pivoting angle of the pivotable shaft 125 is set so that when the steering wheel 120 is turned at a large angle the pivoting angle of the pivotable shaft 125 becomes 180° or thereabout, it becomes possible to return the steering angle of the rear wheels 113 to 0° or thereabout upon large-angle operation of the steering wheel 120.

Figure 8:
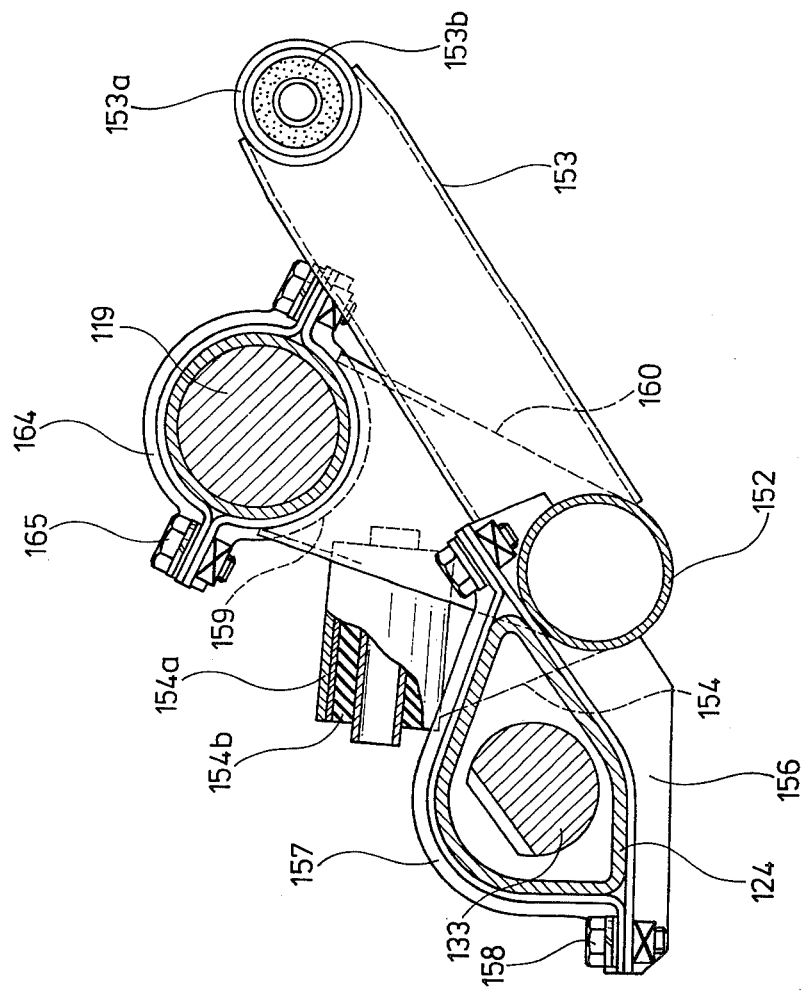
FIG. 8 is a sectional view taken along line 8—8 of FIG. 3.

The following description relates to the structure for mounting the connecting rod 119 and the power cylinder 132 to the vehicle body. FIG. 8, which is a sectional view taken along line 8—8 of FIG. 3, shows such structure, wherein a beam-like support member 152 extends below the connecting rod 119 and the power cylinder 132 in the transverse direction of the vehicle body. Secured to the support member 152, as shown in FIG. 8, is a first arm portion 153 which extends rearwardly upward and a second arm portion 154 which extends forwardly upward, the first arm portion 153 being disposed substantially centrally in the longitudinal direction of the support member 152 and two of the second arm portions 154 being disposed at the end portions in the longitudinal direction of the support member 152. To the tops of the arm portions 153 and 154 are fixed tubular members 153a and 154a, respectively, the tubular member 153a being connected to the vehicle body. Each of the tubular members 154a holds the inner end portion 115a of the lower arm 115 for the rear wheel between it and a mounting boss portion (not shown) formed on the vehicle body, and a shaft schematically shown by chain line 155 in FIG. 3 is inserted in the mounting boss portion, lower arm inner end 115a and tubular member 154a, whereby the support member 152 is connected at three points to the vehicle body and at the same time the support member 152 is utilized for supporting the lower arms 115. Vibration absorbing members 153b and 154b such as rubber or the like for preventing the propagation of vibration between the support member 152 and the vehicle body are fitted in the interior of tubular members 153a and 154a, respectively.

As shown in FIG. 8, a forwardly extending third arm portion 156 is secured to the support member 152, and on the arm portion 156 is disposed the case 124 which is integral with the cylinder barrel 134 of the power cylinder 132 and in which is inserted the piston rod 133 of the power cylinder 132, and by fixing a retaining member 157 to the arm portion 156 with bolts 158, the power cylinder 132 is secured to the support member 152. The power cylinder 132 is so mounted at two loci as shown in FIG. 3. Further secured to the support member 152, as shown in FIG. 8, is a fourth arm portion 160 which extends rearwardly upward and which is provided at the top thereof with a half-split receiving member 159, and on the upper surface of the receiving member 159, as shown in FIG. 7, is disposed a tubular member 163 which is provided on its outer peripheral surface with a vibration absorbing member 161 and on its inner peripheral surface with a bearing 162. A retaining member 164 of a half-split shape symmetrical to the receiving member 159 is secured to the receiving member 159 by means of bolts 165 as shown in FIG. 8, whereby the connecting rod 119 slidably carried on the bearing 162 as shown in FIG. 7 is supported by the support member 152. The connecting rod 119 is so supported also at two loci as shown in FIGS. 3 and 7.

As will be apparent from the foregoing description, the support member 152 functions so as to have the three kinds of members—lower arms 115 for the rear wheels, power cylinder 132 and the connecting rod 119—supported by the vehicle body, and these members, which are disposed by effectively utilizing the rear space of the vehicle body, can be mounted to the vehicle body by a simple structure with a minimum number of parts.

The connecting rod 119, as shown in FIG. 7, is constituted of right and left rod halves 166 and 167 which are joined at the opposed ends thereof, and ball portions 166a and 167a are formed at outer end portions of the rod halves 166 and 167, respectively, while ball receiving members 168 and 169 are mounted in the inner end portions of the right and left rear wheel steering tie rods 118. The ball portions 166a and 167a are slidably held by the ball receiving members 168 and 169, respectively, whereby the connection of the connecting rod 119 with the tie rods 118 is effected, thereby allowing the tie rods 118 to move to steer the rear wheels 113 along with movement of the connecting rod 119 in the transverse direction of the vehicle body. The bearing 162 which supports the connecting rod 119 comprises the combination of an inner member 162a on the inner peripheral side and an outer member 162b on the outer peripheral side. The contact surface of the inner member 162a and the outer member 162b is a spherical surface which is curved and bulged in the outer peripheral direction, and thus the bearing 162 is a spherical bearing having a self-aligning action. Therefore, when the connecting rod 119 moves in the transverse direction of the vehicle body while being carried on the bearings 162, even if this movement is performed at a slight inclination angle to such transverse direction or vertical direction, it is possible to prevent the occurrence of a sliding resistance such as pinching between the bearings 162 and the connecting rod 119, and a smooth movement of the connecting rod 119 can thereby be assured.

The connection between the connecting pin 129 and the connecting rod 119 is effected by a ball joint wherein the ball portion 129a of the connecting pin 129 is slidably held by the ball receiving member 131 of the connecting rod 119, like the connection between the crank pin 127 and the connecting rod 128 and that between the connecting rod 119 and the rear wheel steering tie rods 118, and the center T of the ball portion 129a exists on the axis U of the connecting rod 119. According to this structure, when the connecting rod 119 is moved by a tensile force or compressive force of the connecting rod 128 in the transverse direction of the vehicle body along with crank motion of the crank mechanism J, there is no positional shift or offset between the axis U of the connecting rod 119 and the acting point of the tensile or compressive force, and therefore the connecting rod 119 can be prevented from undergoing a swinging motion, thus permitting it to move in a predetermined linear motion.

As will be apparent from the foregoing description, because the auxiliary power means which constitutes a power steering system is disposed at the rear part of the vehicle body in a position rearward of the axles of the rear wheels, space can be utilized effectively and it becomes to possible to suppress the increase in weight required in mechanical rigidity of the connection path between the front wheel steering mechanism and the rear wheel steering mechanism. Furthermore, because the auxiliary power means, the connecting rod which connects the right and left rear wheel steering tie rods, and the inner end portions of the lower arms for the rear wheels, are each supported by a support member connected to the vehicle body, mounting of these members to the vehicle body can be effected by a simple structure, the number of parts necessary for this structure can be decreased, and the support member can serve as a mounting member common to all three kinds of members.

According to this embodiment, moreover, the connection path between the front wheel steering mechanism and the rear wheel steering mechanism includes an operating shaft which extends in substantially the longitudinal direction of the vehicle body and universal joints are attached to the end portions of the operating shaft, it becomes possible to construct the connection path in the form of a bent path and dispose the operating shaft outside the interior of the vehicle. Thus, for example, the interior vehicle space can advantageously be made larger to facilitate assembling and mounting operations for the connection path. Furthermore, because a cover member is fitted over the outer periphery of the operating shaft, the operating shaft disposed outside the interior of the vehicle can be protected against adverse external conditions such as striking of pebbles and splash of mud.

According to this embodiment, moreover, in constructing the crank mechanism for permitting the rear wheel steering mechanism to perform a rear wheel steering operation by at least a pivotable shaft adapted to pivot in interlock operative cooperation with the steering wheel and a crank pin connected to the rear wheel steering mechanism, a holding member is secured to the pivotable shaft and the crank pin is secured to an extending portion of an L-shaped arm member comprising a base portion which extends in the axial direction of the pivotable shaft and the extending portion which extends in the radial direction of the pivotable shaft, the base portion of the arm member being secured to a spacer member interposed in the holding member, which spacer member has a width in the radial direction of the pivotable shaft. Therefore not only can the mounting operation of the crank pin with respect to the pivotable shaft be performed easily, but also the eccentric amount of the crank pin from the axis of the pivotable shaft for determining the magnitude of a rear wheel steering angle can be set easily according to the thickness of the spacer member.

Figure 9:
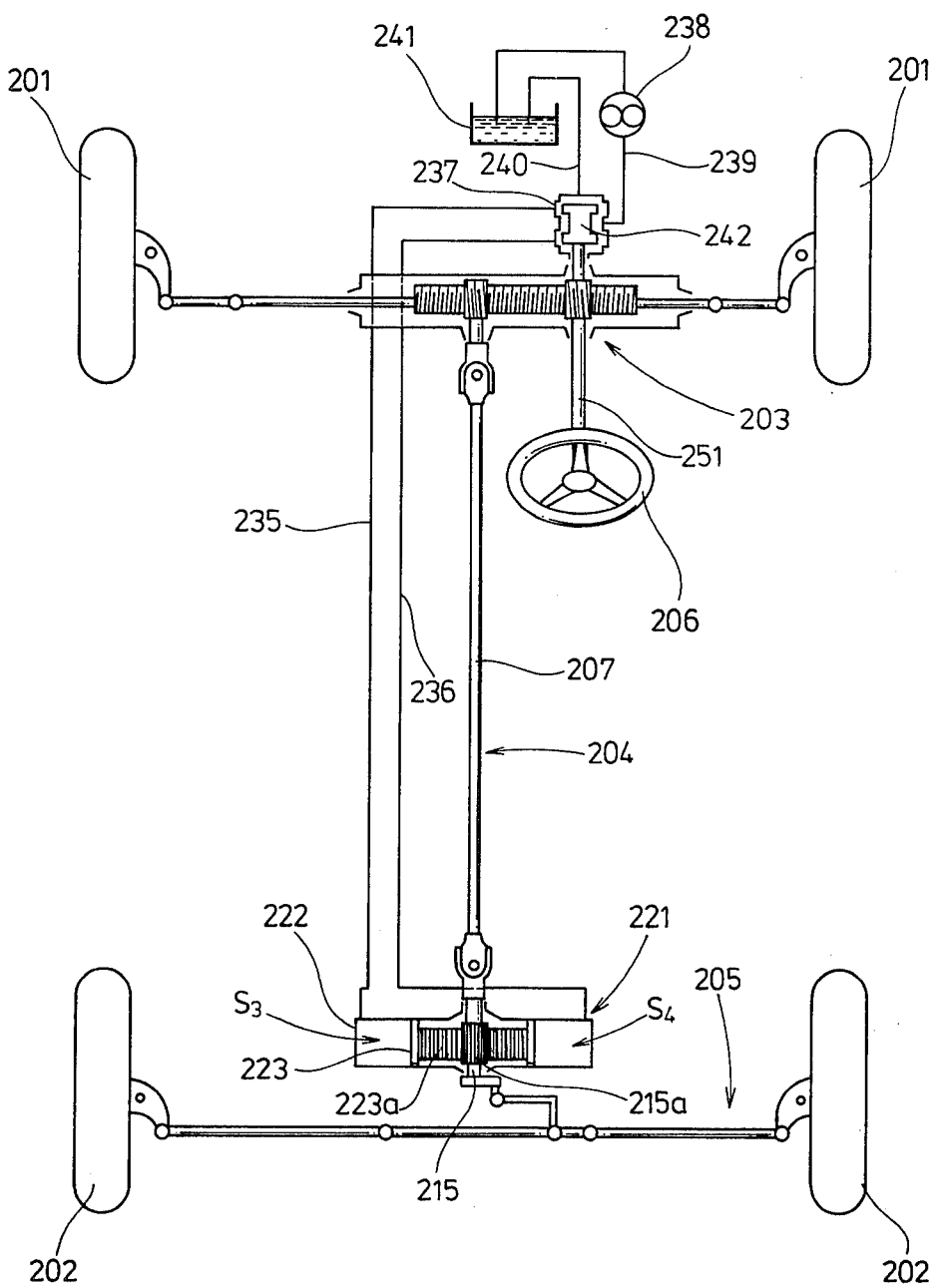
FIG. 9 is a schematic plan view of a principal structure of a vehicle according to a second embodiment of the present invention.

Referring now to FIG. 9, there is shown a second embodiment of the present invention, wherein reference numeral 201 designates right and left front wheels and reference numeral 202 designates right and left rear wheels, the front and rear wheels 201 and 202 being adapted to be steered by operation of a steering wheel 206 through a front wheel steering mechanism 203, a connection path 204 and a rear wheel steering mechanism 205 which are of constructions similar to those in the foregoing first embodiment. The connection path 204 comprises an operating shaft 207 to the rear end of which is connected a pivotable shaft 215. Integral with the pivotable shaft 215 is a pinion 215a and hence the pivotable shaft 215 comprises a pinion shaft. The pivotable shaft 215 extends through a cylinder barrel 222 of a power cylinder 221 for the rear wheels which is disposed at the rear portion of the vehicle body and which extends in the right and left direction, with a piston rod 223 being slidably accommodated within the cylinder barrel 222, the piston rod 223 being shorter than the cylinder barrel 222.

Referring now to FIGS. 10, 11 and 12, there is shown a concrete structure of the power cylinder 221, wherein the piston rod 223 is provided at both end portions thereof with oil seal members 225 and 226 which are in sliding contact with the inner peripheral surface of a cylinder liner 224 disposed within the cylinder barrel and also with pistons 227 and 228 upon which oil pressure acts. The piston rod 223 has rack teeth 223a formed on its upper surface approximately throughout its full length and hence it also serves as a rack shaft. Engaged with the rack teeth 223a is the pinion 215a of the pivotable shaft 215 which is supported within the cylinder barrel 222 rotatably through bearings 229 and 230. Thus, the piston rod 223 is shorter than the cylinder barrel 222 and its engagement with the pivotable shaft 215 is made in the interior of the cylinder barrel 222. Consequently, the length of the power cylinder 221 for the rear wheels becomes equal to that of the cylinder barrel 222, thus permitting a large reduction in length of the power cylinder, which leads to a compact construction. The power cylinder 221 for the rear wheels can thus be disposed at the rear portion of the vehicle body with minimum influence upon the space which must be ensured in the vehicle body for the devices disposed around the power cylinder and for trunk space.

The interior of the cylinder barrel 222 is partitioned into right and left hydraulic fluid feed chambers $S_3$ and $S_4$ by the piston rod 223 which is accommodated centrally within the cylinder barrel 222. The left hydraulic fluid feed chamber $S_3$ is shown by way of example in FIGS. 10 and 12, from which it is seen that the chambers $S_3$ and $S_4$ are each connected to a port 234 through communication holes 232 and an annular groove 233 formed in an end pipe 231 which communicates with the cylinder liner 224. The port 234 formed for each of the right and left hydraulic fluid feed chambers $S_3$ and $S_4$, as shown in FIG. 9, is connected to a valve housing 237 through hydraulic circuits 235 and 236, and the valve housing 237 is connected to an oil tank 241 through a supply hydraulic circuit 239 with an oil pump 238 interposed therein and a return hydraulic circuit 240. Within the valve housing 237 is slidably accommodated a four-way change-over valve 242. The valve 242 is integrally formed on the fore end of a steering shaft 251 which is connected to the steering wheel 206, and is adapted to operate in switching operation by operation of the steering wheel 206.

In steering the rear wheels 202 by the rear wheel steering mechanism 205 through pivotal movement of the pivotable shaft 215 caused by operation of the steering wheel 206, hydraulic fluid is fed to the right and left hydraulic fluid feed chambers $S_3$ and $S_4$ of the power cylinder 221 for the rear wheels according to the steering direction of the steering wheel 206, so that the pivotal movement of the pivotable shaft 215 is assisted by the piston rod 223 which slides by virtue of the oil pressure in the cylinder barrel 222 and the rear wheels are steered with the aid of auxiliary power of the power cylinder 221, whereby the steering torque required of the vehicle driver for the steering wheel 206 is decreased.

According to this embodiment, as will be apparent from the foregoing description, because the piston rod is shorter than the cylinder barrel and assists the steering operation while sliding within the cylinder barrel, the power cylinder can be shortened to the same length as the cylinder barrel, thus resulting in a compact construction of the power cylinder, and the power cylinder can thus be mounted on the vehicle body without being restricted by surrounding devices and members and without affecting the space which must be ensured in the vehicle body.

Figure 13:
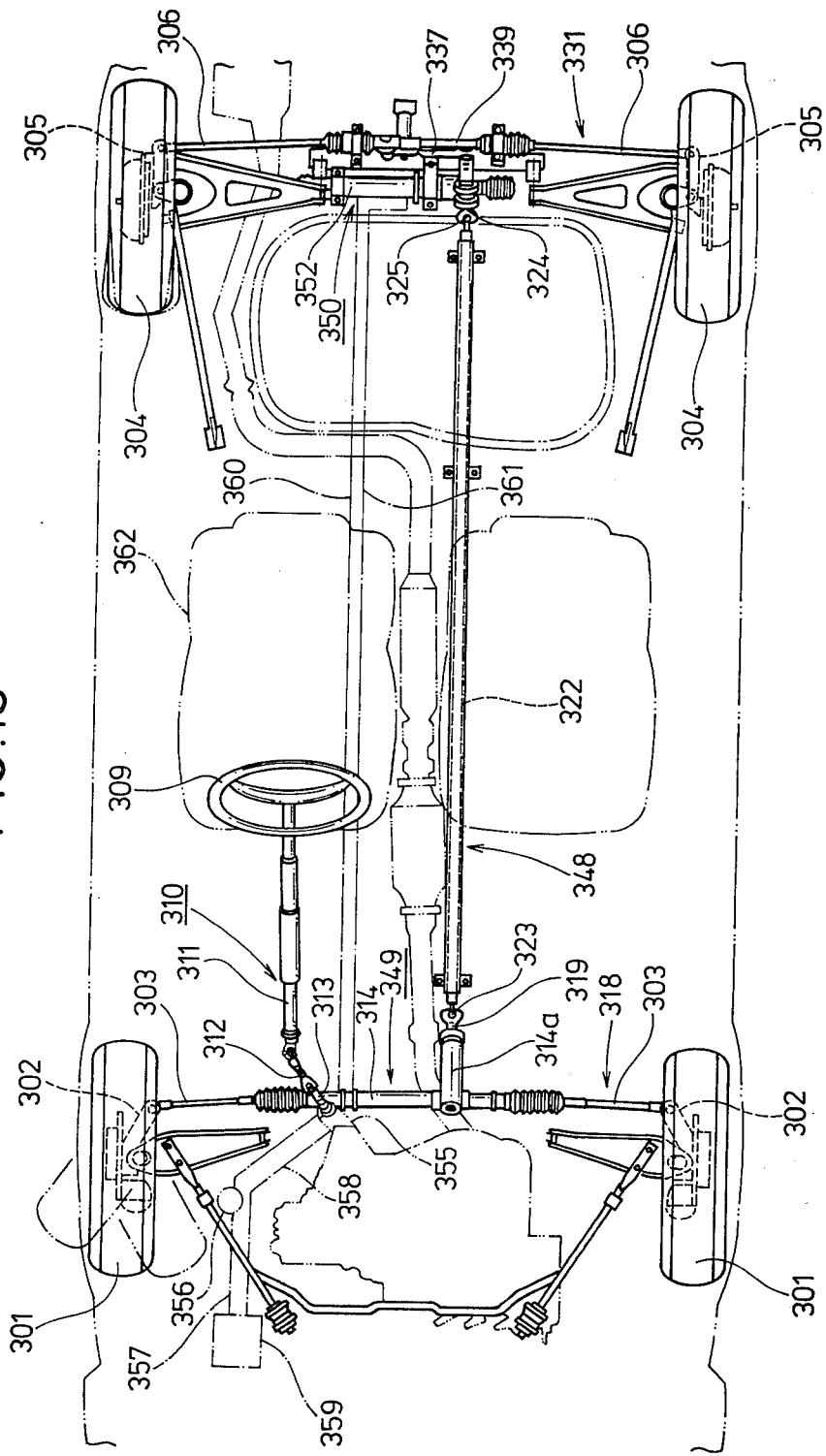
FIG. 13 is an overall plan view similar to FIG. 2 showing a third embodiment of the present invention.
Figure 14:
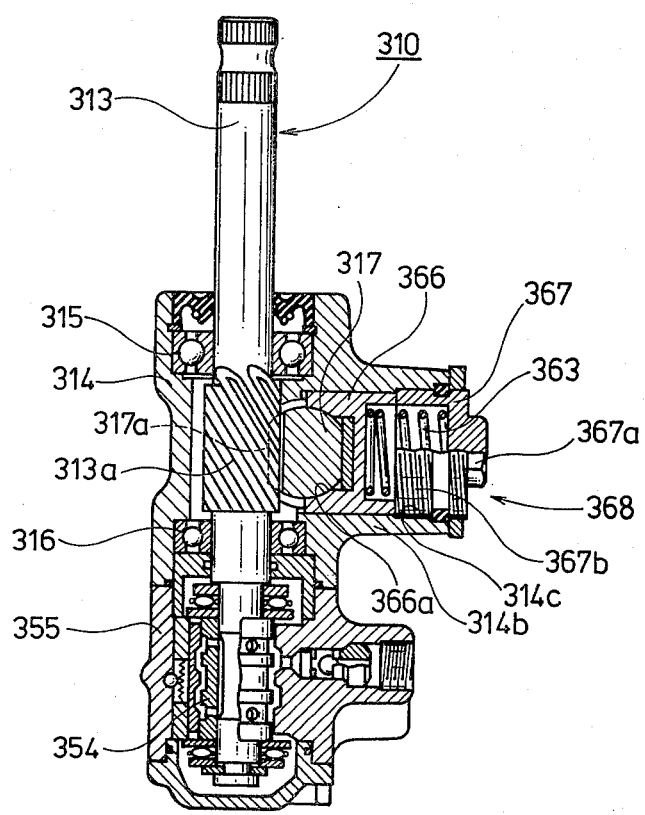
FIG. 14 is a sectional side view of a steering shaft, a power cylinder for front wheels, and surrounding structure.
Figure 15:
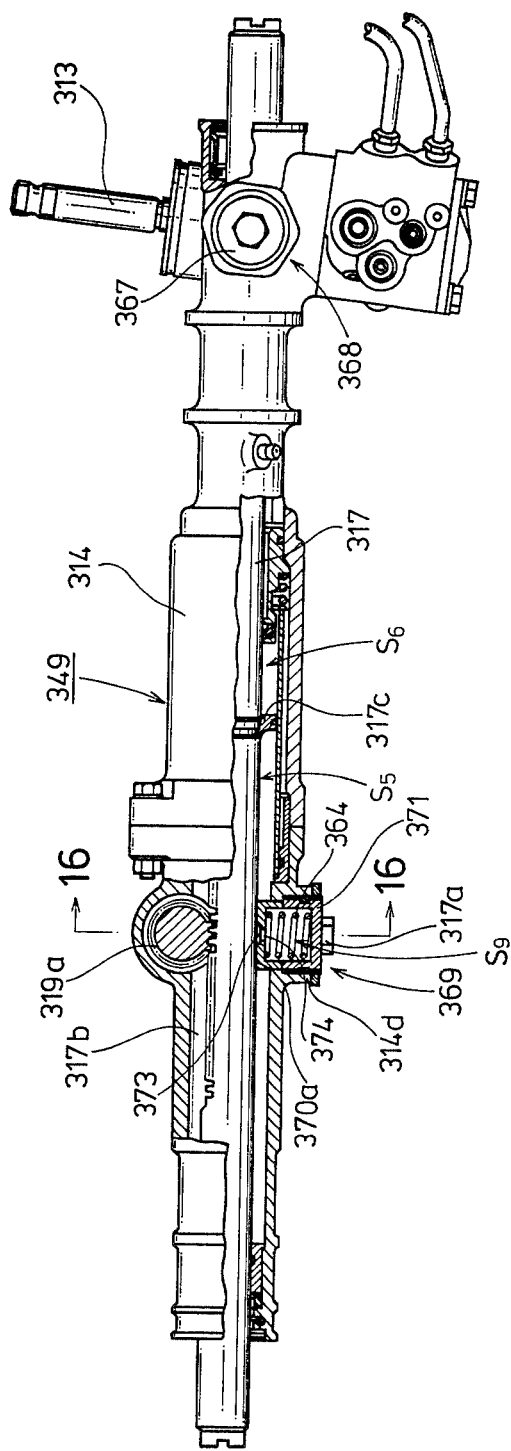
FIG. 15 is a rear view, partly in section, of the power cylinder for the front wheels.

Referring now to FIG. 13, there is shown a third embodiment of the present invention, wherein there is shown right and left front wheels 301, knuckle arms 302 for the front wheels, front wheel steering tie rods 303, right and left rear wheels 304, knuckle arms 305 for the rear wheels and rear wheel steering tie rods 36. A steering shaft 310 is connected to a steering wheel 309 to be operated by the vehicle driver, and comprises a main shaft 311, an intermediate shaft 312 and an output shaft 313. As shown in FIG. 14, the output shaft 313 is supported rotatably by bearings 315 and 316 in the interior of the cylinder barrel 314 at one side of the barrel, and a pinion 313a is integrally formed on the output shaft 313. As shown in FIGS. 13 and 15, the cylinder barrel 314 is in the form of a long tube extending in the right and left direction, and within the cylinder barrel 314 is slidably inserted a piston rod 317. To the end portions of the piston rod 317 which project from both ends of the cylinder barrel 314 are connected inner end portions of the front wheel steering tie rods 303. As shown in FIG. 14, a rack 317a is formed axially on the piston rod 317 and engages the pinion 313a. Therefore, when the steering wheel 309 is turned, a steering torque is transmitted to the piston rod 317 through the steering shaft 310, so that the piston rod 317 moves linearly in the right and left direction and the consequent movement of the tie rods 303 in the same direction causes the front wheels 301 to be steered. The piston rod 317, knuckle arms 302 and tie rods 303 constitute a front wheel steering mechanism 318 which is disposed at the front portion of the vehicle.

Figure 18:
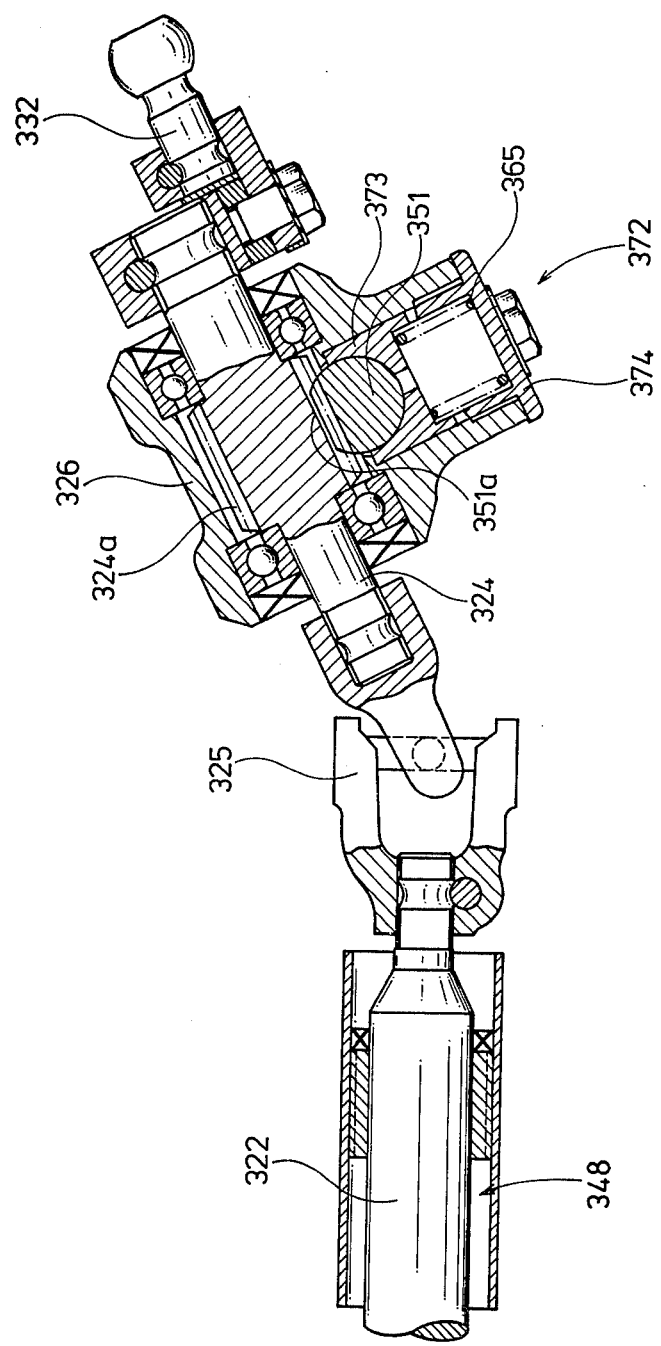
FIG. 18 is a sectional side view of an input shaft adjacent to a rear wheel steering mechanism, and surrounding structure.

As shown in FIG. 15, a rack 317b separate from the rack 317a is formed on the piston rod 317 and engages a pinion 319a. The pinion 319a is integrally formed on the fore end of a connecting shaft 319 as shown in FIG. 16, the connecting shaft 319 being supported rotatably by bearings 320 and 321 in the interior of a case 314a integral with the cylinder barrel 314 and extending from the piston rod 317 obliquely downward toward the rear. To the rear end of the connecting shaft 319, as shown in FIG. 13, is connected through a universal joint 323 the fore end of an operating shaft 322 which extends in substantially the longitudinal direction of the vehicle body, while to the rear end of the operating shaft 322 is connected the rore end of a pivotable shaft 324 through a universal joint 325. As shown in FIG. 18, the pivotable shaft 324, which extends from the operating shaft 322 obliquely upward toward the rear, is rotatably supported within a gear box 326.

The connecting shaft 319 is pivoted by a linear motion of the piston rod 317 in the right and left direction induced by operation of the steering wheel 309 and this pivotal movement of the connecting shaft 319 is transmitted to the pivotable shaft 324 through the operating shaft 322, so that the pivotable shaft 324 pivots in operative cooperation with the steering shaft 309. As a result, a rear wheel steering mechanism 331 operates to steer the rear wheels 304 and hence the pivotable shaft 324 serves as an input shaft for providing a rear wheel steering force to the rear wheel steering mechanism 331. A crank pin 332 is provided at the rear end of the pivotable shaft 324. The crank pin 332 and the rear wheel steering mechanism 331 are connected through a connecting rod 337.

Figure 19:
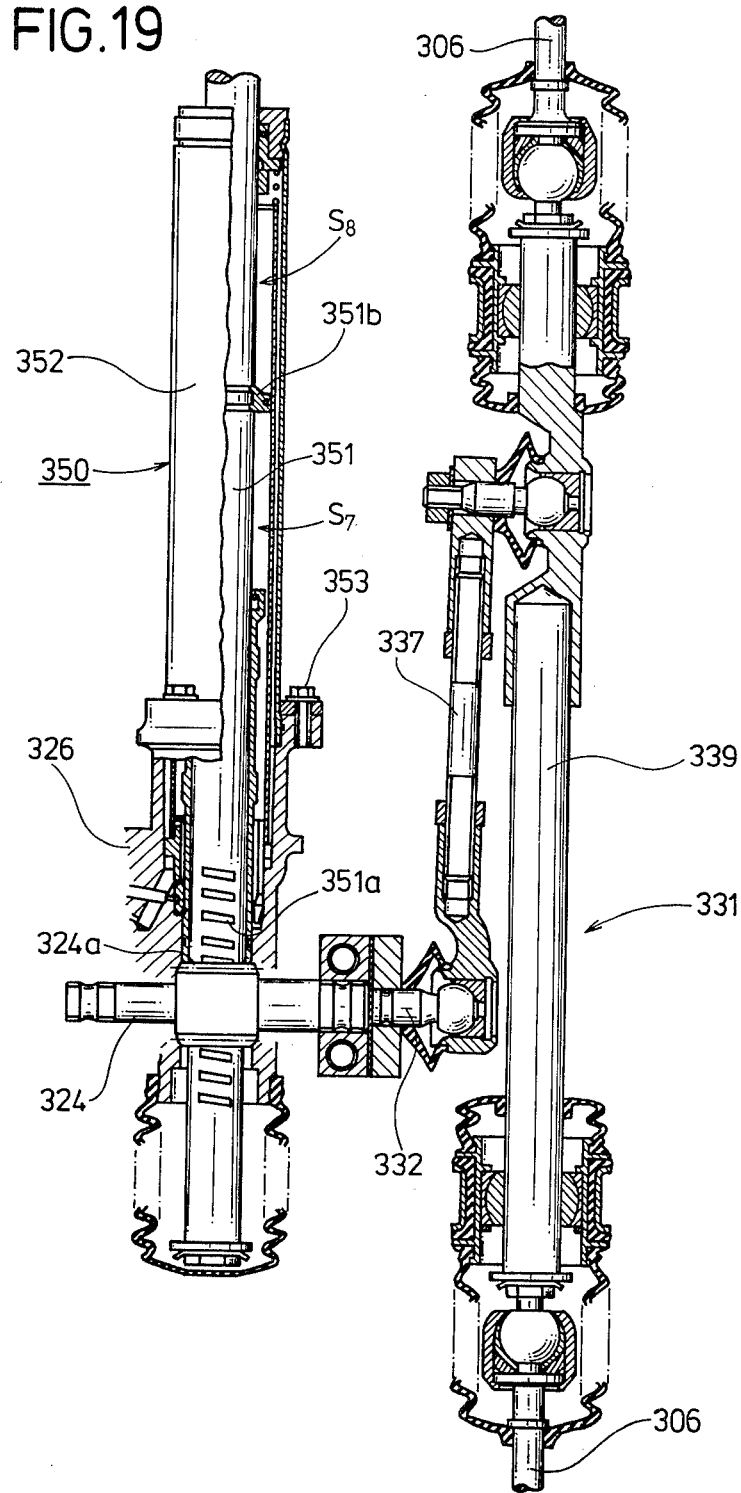
FIG. 19 is a sectional plan view of the rear wheel steering mechanism and surrounding structure.

The rear wheel steering mechanism 331, as shown in FIGS. 13 and 19, is constituted by the knuckle arms 305, the rear wheel steering tie rods 306 and a connecting rod 339. As the pivotable shaft 324 pivots in operative cooperation with the steering wheel 309, the connecting rod 337 is moved in the right and left direction by the crank pin 332 which pivots about the pivotable shaft 324, so that the connecting rod 339 moves to the right or left in an amount corresponding to the pivotal movement of the crank pin 332, whereby the rear wheels 304 are steered together with steering of the front wheels which is effected by the front wheel steering mechanism 318.

The steering torque applied to the steering wheel 309, as previously noted, is transmitted through the steering shaft 310 shown in FIG. 13 and the piston rod 317 inserted in the cylinder barrel 314 to the front wheel steering mechanism 318 and at the same time it is transmitted to the rear wheel steering mechanism 331 through a connection path 348 which comprises the connecting shaft 319, operating shaft 322 and pivotable shaft 324. Thus, the front wheel steering system and the rear wheel steering system are common in the piston rod 317, i.e., both steering systems can be constituted of common components of the communication path and therefore the construction of the path can be simplified.

As shown in FIG. 15, the piston rod 317 inserted in the cylinder barrel 314 is provided with a piston 317c which partitions the interior of the cylinder barrel 314 into right and left hydraulic fluid feed chambers $S_5$ and $S_6$. Thus, the cylinder barrel 314 comprises a cylinder barrel of a power cylinder 349 and the piston rod 317 comprises a piston rod of the power cylinder 349, the power cylinder 349 being provided for the front wheels. The piston rod 317 has the rack 317b as shown in FIGS. 15 and 16 which engages the pinion 319a of the connecting shaft 319 which constitutes a front shaft of the connection path 348, and therefore the power cylinder 349 for the front wheels disposed at the front portion of the vehicle like the front wheel steering mechanism 318, is connected to the front portion of the connection path 348. On the other hand, to the rear portion of the connection path 348 is connected a power cylinder 350 for the rear wheels as shown in FIG. 13. The structure of the power cylinder 350 for the rear wheels is shown in FIGS. 18 and 19. A pinion 324a is integrally formed on the input shaft 324 inserted through the gear box 326 and engages a rack 351a of a piston rod 351 which extends in the right and left direction of the power cylinder 350 for the rear wheels, whereby the power cylinder 350 disposed at the rear portion of the vehicle, like the rear wheel steering mechanism 331, is connected to the rear part of the connection path 348 at the input shaft 324 which constitutes a rear shaft of the connection path 348. As shown in FIG. 19, the piston rod 351 is slidably inserted in a cylinder barrel 352, the interior of which is partitioned by a piston 351b of the piston rod 351 into right and left hydraulic fluid feed chambers $S_7$ and $S_8$. The cylinder barrel 352 is integrally connected to the gear box 326 with bolts 353.

Into the right and left hydraulic fluid feed chambers $S_5$, $S_6$, $S_7$ and $S_8$ of the front and rear wheel power cylinders 349 and 350 is selectively fed hydraulic fluid according to the steering direction of the steering wheel 309 by means of a change-over valve 354 which is shown in FIG. 14. The change-over valve 354, which is an open center type four-way valve, is formed integrally at the lower portion of the output shaft 313 of the steering shaft 310. A valve housing 355 which accommodates the change-over valve 354 is integrally connected to the cylinder barrel 314. The interior chamber of the valve housing 355, as shown in FIG. 13, is connected to an oil tank through a supply hydraulic pipe 357 with an oil pump 356 interposed therein and a return hydraulic pipe 358. Furthermore, the interior chamber of the valve housing 355 is connected to the right and left hydraulic fluid feed chambers $S_5$ and $S_6$ through holes formed in the wall of the cylinder barrel 314 and is also connected to the hydraulic fluid feed chambers $S_7$ and $S_8$ of the power cylinder 350 for the rear wheels through hydraulic pipes 360 and 361 which extend from the front to the rear of the vehicle. The hydraulic pipes 360 and 361 for supplying hydraulic fluid from the oil tank 359 to the power cylinder 350 for the rear wheels pass the lower surface of a seat 362 and are disposed within the interior of the vehicle, and are thus protected against bad adverse influences from the exterior, for example, the splash of mud.

As shown in FIG. 14, the pinion 313a of the output shaft 313 provided with the change-over valve 354 has helical teeth, and the rack 317a of the piston rod 317 in the power cylinder for the front wheels which engages the pinion 313a has corresponding helical teeth. Consequently, when the steering wheel 309 is turned and its steering torque is transmitted to the output shaft 313, the output shaft 313 undergoes an axial thrust, whereby the change-over valve 354 advances or retreats, though only slightly, according to the turning direction of the steering wheel 309 to perform its switching operation for hydraulic fluid, so that hydraulic fluid is fed through the foregoing hydraulic pipes selectively into either right or left hydraulic fluid feed chambers of the front and rear wheel power cylinders 349 and 350 corresponding to the steering direction of the steering wheel 309.

The piston rod 317 of the front wheel power cylinder 349 supplied with hydraulic fluid slides in the right and left direction by virtue of oil pressure acting on the piston 317c shown in FIG. 15, whereby the front wheel steering operation is performed while receiving auxiliary power from the front wheel power cylinder 349. At the same time, the piston rod 351 of the rear wheel power cylinder 350 slides in the right and left direction by virtue of oil pressure acting on the piston 351b shown in FIG. 19, and because the pivotal movement of the pivotable shaft 324 is performed with the aid of the sliding force of the piston rod 351, the rear wheel steering operation is carried out while receiving an auxiliary force from the rear wheel power cylinder 350. Consequently, the steering torque which the vehicle driver must impart to the steering wheel 309 for steering both front and rear wheels 301 and 304 can be reduced.

According to this embodiment, as set forth hereinabove, because the two power cylinders 349 and 350 for the front and rear wheels, respectively, are connected to the front and rear portions of the connection path 348, auxiliary power from the front wheel power cylinder 349 and that from the rear wheel power cylinder 350 can be directly transmitted to the front wheel steering mechanism 318 and to the rear wheel steering mechanism 331, respectively, and consequently the connecting shaft 319, operating shaft 322 and pivotable shaft 324 can be made smaller in diameter and in thickness.

As will be apparent from the foregoing description, a rack and pinion mechanism for converting a pivotal motion into a linear motion or vice versa is adopted in the present invention. To ensure that the direction of movement is changed and a wheel steering force is transmitted, it is necessary to maintain the rack and pinion at a predetermined depth of engagement for ensuring an appropriate engaging force at all times. To this end, as shown in FIGS. 14, 15, 16 and 18, a biasing force of springs 363, 364 and 365 is exerted on the surface of the piston rods 317 and 351 on the side opposite to the surfaces on which are formed the racks 317a, 317b and 351a meshing with the pinions 313a, 319a and 324a.

The spring 363 shown in FIG. 14 constitutes a compression means 368 together with a receiving member 366 and an advancing and retreating member 367. The receiving member 366, which is slidably inserted in the interior of a tubular guide portion 314b of the cylinder barrel 314, has a recess 366a, and in the recess 366a is received the surface of the piston rod 317 on the side opposite to the rack 317a. The advancing and retreating member 367 is in the form of a short-shaft bolt provided at its outer end portion with a hexagon head portion 367a and on its outer peripheral surface with an externally threaded portion 367b, and threadedly engaged with an internally threaded portion 314c formed on the inner peripheral surface of the guide portion 314b. By turning the hexagon head portion 367a, the advancing and retreating member 367 is advanced or retreated whereby the biasing force of the spring 367 interposed between the advancing and retreating member 367 and the receiving member 366 is adjustably increased or decreased, and by virtue of a compressive force of the compression means 368 based on the biasing force of the spring 363, engagement of the rack 317a of the piston rod 317 with the pinion 313a of the output shaft 313 is ensured.

A compression means 369 shown in FIGS. 15 and 16 is of the same structure as the compression means 368. The compression means 369, which is slidably inserted in a tubular guide portion 314d of the cylinder barrel 314, comprises a receiving member 370 having a recess 370a formed on the upper surface thereof for receiving the surface of the piston rod 317 on the side opposite to the rack 317b, an advancing and retreating member 371 in the form of a short-shaft bolt provided with a hexagon head portion 371a and threadedly engaged with the guide portion 314d, and the spring 364 interposed between the receiving member 370 and the advancing and retreating member 371. The compression means 369 functions to bring the rack 317b of the piston rod 317 into pressure engagement with the pinion 319a of the connecting shaft 319.

A compression means 372 shown in FIG. 18 is also constructed similarly to compression means 368 and comprises a receiving member 373, an advancing and retreating member 374 and the spring 365.

As will be apparent from the foregoing description, different racks 317a and 317b are formed on the piston rod 317 of the power cylinder 349 the front wheels, and the pinions 313a and 319a respectively of the output shaft 313 and connecting shaft 319 as separate pinion shafts are in engagement with the racks 317a and 317b, the respective engagements being made under the compressive force of the compression means 368 and 369. In such a construction wherein two rack and pinion engaging portions exist on the same shaft, adjustment of the compressive force of one compression means causes a slight movement of the piston rod 317 due to deflection in the direction of compression, so that a specific rack and pinion engaging condition held by the other compression means may be affected.

FIG. 17 is a sectional view of the piston rod 317 showing a positional relationship of engagement between the racks 317a, 317b of the piston rod 317 and the pinions 313a, 319a respectively of the output shaft 313 and connecting shaft 319. Because the pinions 313a and 319a define an angle of $\theta$, the racks 317a and 317b are formed at the angle $\theta$ on the outer peripheral surface of the piston rod 317. In case the angle $\theta$ is set at 0° or 180°, i.e., in case there exists an angle neither between the pinions 313a and 319a nor between the racks 317a and 317b, if one of the two compression means 368 and 369 which exerts a compressive force on the surface of the piston rod 317 on the side opposite to the racks 317a and 317b, for example, the compression means 368, is adjusted in its compressive force to adjust the state of engagement between the rack 317a and the pinion 313a, there occurs a change in the state of engagement between the rack 317b and the pinion 319a because the direction of movement of the piston rod 317 caused by the compressive force adjustment coincides with the direction of depth of engagement between the rack 317b and the pinion 319a. This problem can be overcome by a construction wherein the racks 317a, 317b and the pinions 313a, 319a define an angle of the direction of movement of the piston rod 317 in adjusting the compressive force of the compression means 368 deviates from the direction of depth of engagement between the rack 317b and the pinion 319a. This problem is overcome most effectively when the angle $\theta$ between the racks 317a and 317b and that between the pinions 313a and 319a are equal to 90°, and it is ideal to set the angle $\theta$ at 90°. However, even if such angle is set to be other than 0° and 180° due to restrictions in design considering the arrangement of members, etc., utility is attained.

As apparent from FIG. 15, the compression means 369 for engaging the pinion 319a of the connecting shaft 319 with the rack 317b of the piston rod 317 is disposed at a portion of the left hydraulic fluid feed chamber S5 of the front wheel power cylinder 349, and the receiving member 370 of the compression means 369 faces the chamber S5. The pressure of the hydraulic fluid fed to the chamber S5 acts on the outer periphery of the piston rod 317, but because the receiving member 370 is in contact with part of the lower surface of the piston rod 317, the total oil pressure acting on the upper surface of the piston rod 317 is larger than that of oil pressure acting on the lower surface thereof in accordance with the contact area between the piston rod 317 and the receiving member 370. Because the receiving member 370 is in close slidable contact with the inner peripheral surface of the tubular guide portion 314d, the space S9 between the receiving member 370 and the advancing and retreating member 371, wherein the spring 364 is accommodated, is isolated from the hydraulic fluid feed chamber S5. Consequently, even if the compressive force of the compression means 369 is adjusted by increasing or decreasing the biasing force of the spring 364 while turning the advancing and retreating member 371 threadedly, a desired compressive force may not be obtained because of the existence of difference between the total oil pressure acting on the upper surface and that on the lower surface of the piston rod 317.

To avoid such inconvenience, a communication groove 373 having an open end portion which faces the hydraulic fluid feed chamber S5 is formed in the recess 370a of the receiving member 370 which is in contact with the piston rod 317, and is connected with the space S9 through a communication hole 374. As a result, the hydraulic fluid feed chamber S5 and the space S9 communicate with each other through a communicating portion 375 which comprises the communication groove 373 and the communication hole 374 formed in the receiving member 370, thus allowing the hydraulic fluid in the hydraulic fluid feed chamber S5 to flow into the space S9. Consequently, the total oil pressure acting on the receiving member 370 through the space S9 serves to eliminate the foregoing difference in total oil pressure between the upper and lower surfaces of the piston rod 317, and therefore the biasing force of the spring 364 can be utilized directly as the compressive force of the compression means for engaging the pinion 319a with the rack 317b.

According to this embodiment, as will be apparent from the foregoing description, two rack portions are formed on the piston rod of the power cylinder for engagement with pinions formed on two shafts, and a compression means for exerting a compressive force on the surface of the piston rod opposite to the rack surface is provided in the power cylinder in order to maintain both rack and pinion portions at a predetermined state of engagement, and in this case, the two rack portions and the pinions on the two shafts are disposed at an angle. In this manner, even if the adjustment of the compressive force of one compression means causes deflection and consequent movement of the piston rod, a specific state of engagement between rack and pinion held by the other compression means can be prevented from being changed, and thus the rack and pinion engagements can each be adjusted independently by the respective compression means.

Figure 20:
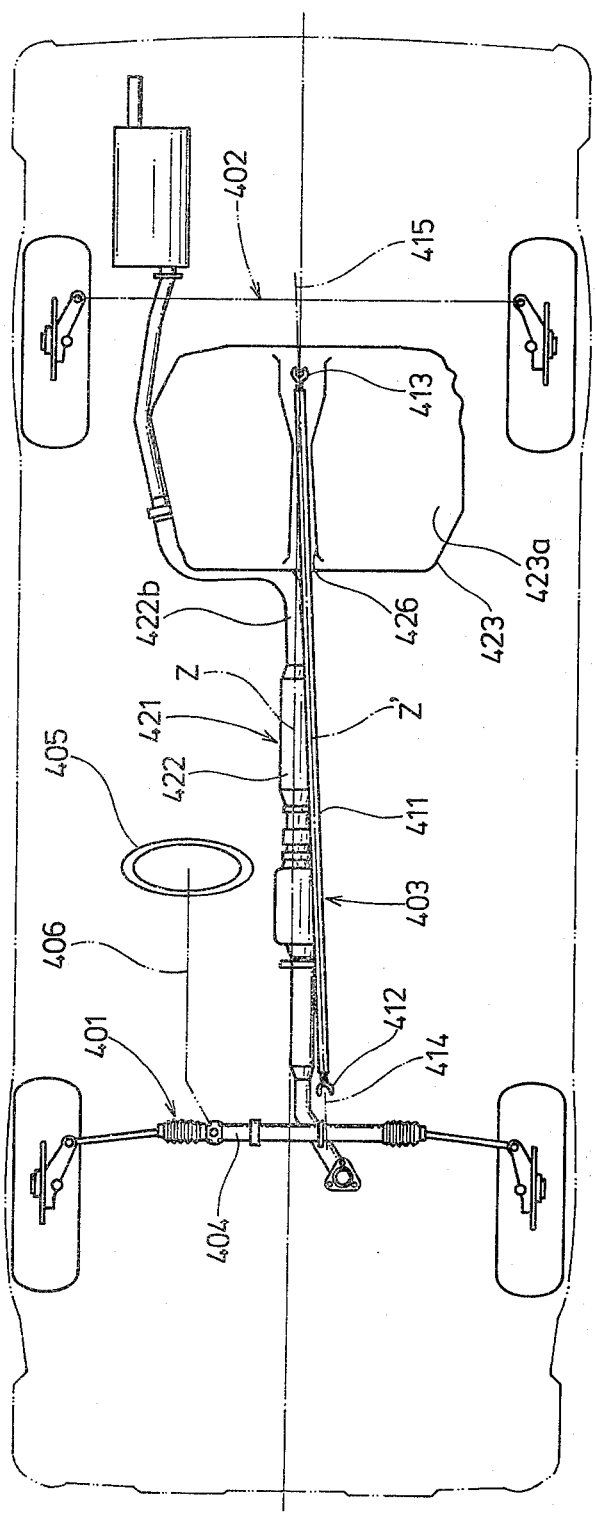
FIG. 20 is a schematic plan view of a vehicle according to a fourth embodiment of the present invention.

Referring now to FIG. 20, there is shown a fourth embodiment of the invention, wherein the reference numerals 401 and 402 designate a front wheel steering mechanism and a rear wheel steering mechanism, respectively, which are of a similar structure to those shown in the foregoing embodiment, the numeral 403 designates a connection path connecting between the front wheel steering mechanism 401 and the rear wheel steering mechanism 402.

The front wheel steering mechanism 401 is provided with a power cylinder 404 for the front wheels, and in the power cylinder 404 is inserted a piston rod having a rack formed thereon which engages a pinion formed on a steering shaft 406, the steering shaft 406 being connected to a steering wheel 405.

The connection path 403 comprises an operating shaft 411 which extends substantially in the longitudinal direction of the vehicle body, a pinion shaft 414 and a pivotable shaft 415, the pinion shaft 414 and the pivotable shaft 415 being connected to the ends of the operating shaft 411 through universal joints 412 and 413. The operating shaft 411 and the pinion shaft 414 are on a generally straight line Z', the operating shaft 411 is inclined with respect to a central line Z passing through the center in the transverse direction of the vehicle body, and the pinion shaft 414 is in engagement with the rack portion in a left-hand position of the piston rod.

Figure 21:
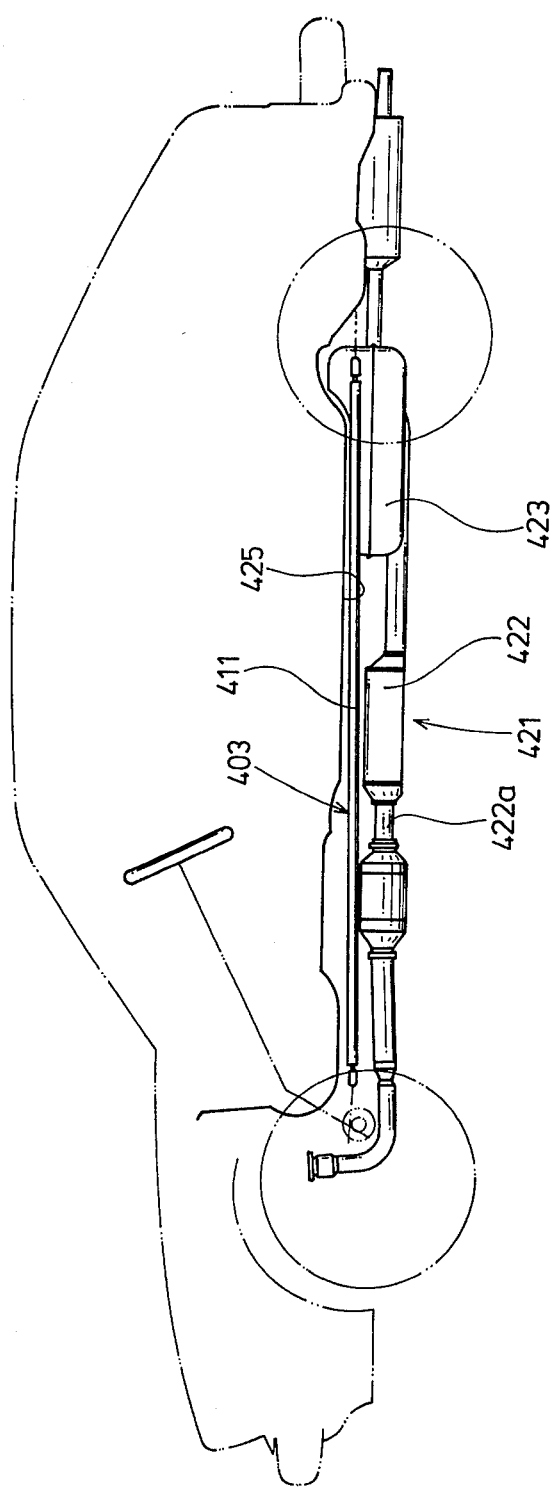
FIG. 21 is a side view of the vehicle shown in FIG. 20.

In this embodiment, moreover, the operating shaft 411 is disposed in a position higher than that of lower members 421 such as an exhaust pipe 422 and a fuel tank 423 which are disposed on the lower portion of the vehicle body, whereby it is intended to permit the lower members 421 to serve as a protective member for the connection path 403. More specifically, the connection path 403 is disposed within a tunnel 425 (FIG. 21) substantially centrally formed in the longitudinal direction of the vehicular floor panel, and the operating shaft 411, from its front part to a portion near its rear part, is disposed above a front-half portion 422a of the exhaust pipe 422 which is substantially centrally disposed in the longitudinal direction of the vehicle body, further, the rear part of the operating shaft 411 is disposed with a groove 426 which is substantially longitudinally formed centrally in an upper wall portion 423a of the fuel tank 423.

As shown in FIG. 20, a rear-half portion 422b of the exhaust pipe 422 is bent sideways from the fore end of the fuel tank 423 and is further extended along a side end of the tank 423 up to the rear of the vehicle body, and in this case the operating shaft 411 is positioned above the front- and rear-half portions 422a and 422b of the exhaust pipe 422.

Thus, the operating shaft 411 is inserted in the tunnel 425, and is disposed at its front part up to a portion near its rear part above the front-half portion 422a of the exhaust pipe 422, with its rear part being disposed above the fuel tank 423, and therefore the exhaust pipe 422 and the fuel tank 423 can serve as a protector from below for the pinion shaft 414, pivotable shaft 415 and operating shaft 411.

In addition, because the space within the tunnel 425 is utilized, it is possible to minimize influence upon the interior vehicle space, and the operating shaft 411, which is a very important member in this kind of steering system, can be protected against obstacles on the road, rebounding stones, etc.

As shown in this embodiment, moreover, by disposing the rear part of the operating shaft 411 within the groove 426 formed in the upper wall portion 423a of the fuel tank 423, it is possible to minimize adhesion of mud, water, or the like to the operating shaft 411 and to the pivotable shaft 415, and it is also possible to prevent flying pebbles or the like from biting in demaging the connection path. Consequently, the reliability and durability of the connection path 403 are greatly improved.

It is not always necessary to construct the connection path as in the foregoing embodiment. For example, even if the connection path 403 is disposed above only one of the exhaust pipe 422 and the fuel tank 423, the protection of the connection path 403 is attainable.

According to this embodiment, as will be apparent from the foregoing description, because the connection path is inclined with respect to the central line passing through the center in the transverse direction of the vehicle body, it is possible to prevent the connection path and the steering shaft from interfering with each other in the front wheel steering mechanism.

According to this embodiment, moreover, because the connection path is disposed above the protective members such an exhaust pipe and a fuel tank, it is possible to protect the connection path comprising the pinion shaft, pivotable shaft and operating shaft.

What is claimed is:

1. In a vehicular steering system including a steering wheel, right and left front wheels, a front wheel steering mechanism, right and left rear wheels and a rear wheel steering mechanism, with both said front wheels and said rear wheels being steered by said steering mechanisms by operation of said steering wheel, the improvement comprising:
    a front wheel steering system which connects said steering wheel with said front wheels through said front wheel steering mechanism;
    a connection path which connects said front wheel steering mechanism with said rear wheel steering mechanism;
    a crank mechanism interposed between said connection path and said rear wheel steering mechanism so as to connect same with each other such that the ratio between a steering angle of said front wheels and a steering angle of said rear wheels is variable and depends upon a steering angle of said steering wheel;
    a rear wheel steering system which connects said steering wheel with said rear wheels through said connection path and said rear wheel steering mechanism; and
    an auxiliary power means connected to said connection path for assisting said steering wheel in steering operation.

2. A vehicular steering system according to claim 1, wherein said rear wheels have respective rear wheel axles, and said auxiliary power means is disposed in the vehicle body in a position rearward of said rear wheel axles.

3. A vehicular steering system according to claim 1, wherein said rear wheels are each supported by a rear suspension system including at least a lower arm; said rear wheel steering mechanism comprises a pair of right and left knuckle arms for supporting said right and left rear wheels, a pair of right and left tie rods connected to said knuckle arms, and a connecting rod connected at both end portions thereof to said right and left tie rods; said auxiliary power means is disposed at the rear portion of the vehicle; and said steering system is further provided with a support member connected to the vehicle body for supporting an inner end portion of said lower arm and said auxiliary power means and said connecting rod.

4. A vehicular steering system according to claim 3, wherein said rear wheels have respective rear wheel axles, and said auxiliary power means and said connecting rod are disposed in the vehicle body in positions rearward of said rear wheel axles.

5. A vehicular steering system according to claim 1, wherein said connection path is provided with a pinion portion, and said auxiliary power means comprises a power cylinder device comprising a cylinder barrel, at least one piston slidably fitted in the interior of said cylinder barrel, a piston rod connected to said piston and right and left hydraulic fluid feed chambers formed by partitioning the interior of said cylinder barrel with said piston, with hydraulic fluid being selectively fed to said right and left hydraulic fluid feed chambers according to the steering direction of said steering wheel, said piston rod having a rack portion formed thereon, said rack portion and said pinion portion being engaged with each other.

6. A vehicular steering system according to claim 5, wherein said piston and rod each project at one end thereof from said cylinder barrel, with a rack portion being formed on said one end of said piston rod, said rack portion being engaged with said pinion portion.

7. A vehicular steering system according to claim 5, wherein said piston rod has a length less than that of said cylinder barrel, said piston is provided at both ends of said piston rod, and said piston rod is slidable within said cylinder barrel together with said pistons, with a rack portion being formed on said piston rod, said rack portion being engaged with said pinion portion.

8. A vehicular steering system according to claim 1, wherein:
said connection path includes a pivotable operating shaft which extends in substantially the longitudinal direction of the vehicle body and a pivotable shaft connected to an end portion of said operating shaft, with a crank pin eccentric from the axis of said pivotable shaft being secured to said pivotable shaft, said crank pin being connected to said rear wheel steering mechanism; and
there is further provided an L-shaped arm member, said arm member comprising a base portion which extends in the axial direction of said pivotable shaft and an extending portion which extends in the radial direction of said pivotable shaft from said base portion, and said crank pin is secured to said extending portion of said arm member, with a holding member being secured to said pivotable shaft and with a spacer member having its width dimension in the radial direction of said pivotable shaft being interposed between said holding member and said base portion of said arm member.

9. A vehicular steering system according to claim 1, wherein:
said connection path includes a pivotable operating shaft which extends in substantially the longitudinal direction of the vehicle body and a pivotable shaft connected to an end portion of said operating shaft, with a crank pin eccentric from the axis of said pivotable shaft being secured to said pivotable shaft;
said rear wheel steering mechanism comprises a pair of right and left knuckle arms for supporting said right and left rear wheels, a pair of right and left tie rods connected to said knuckle arms and a connecting rod connected at the end portions thereof to said right and left tie rods;
said crank pin and said connecting rod are connected through a connecting rod; and
both said connecting rods are connected by a ball joint with a center of a ball portion thereof being disposed approximately on the axis of said connecting rod connected to said tie rods.

10. A vehicular steering system according to claim 1, wherein said rear wheel steering mechanism comprises a pair of right and left knuckle arms for supporting said right and left rear wheels, a pair of right and left tie rods connected to said knuckle arms and a connecting rod connected at the end portions thereof to said right and left tie rods, said connecting rod being supported by bearings for sliding motion in the transverse direction of the vehicle body and for angular displacement.

11. A vehicular steering system according to claim 1, wherein said connection path is inclined with respect to a central line passing through the center in the transverse direction of the vehicle body.

12. In a vehicular steering system including a steering wheel, right and left front wheels, a front wheel steering mechanism, right and left rear wheels and a rear wheel steering mechanism, with both said front wheels and said rear wheels being steered by said steering mechanisms by operation of said steering wheel, the improvement comprising;
a front wheel stering system which connects said steering wheel with said front wheels through said front wheel steering mechanism;
a connection path which connects said front wheel steering mechanism with said rear wheel steering mechanism;
a rear wheel steering system which connects said steering wheel with said rear wheels through said connection path and said rear wheel steering mechanism;
an auxiliary power means connected to said connection path for assisting said steering wheel in steering operation;
said front wheel steering system and said rear wheel steering system having a common path;
detecting means for detecting a steering torque of said steering wheel being mounted in said common path, said detecting means being connected to said auxiliary power means;
said front wheel steering mechanism comprising a pair of right and left knuckle arms for supporting said right and left front wheels, a pair of right and left tie rods connected to said knuckle arms, and a rack rod connected at both end portions thereof to said right and left tie rods;
said common path including said rack rod; and
said rack rod being in engagement with a pinion adapted to pivot integrally with said steering wheel and also with a pinion which comprises part of said connection path.

13. A vehicular steering system according to claim 12, wherein:
said rear wheels are each supported by a rear suspension system including at least a lower arm;
said rear wheel steering mechanism comprises a pair of right and left knuckle arms for supporting said right and left rear wheels, a pair of right and left tie rods c=connected to said knuckle arms, and a connecting rod connected at both end portions thereof to said right and left tie rods;
said auxiliary power means is disposed at the rear portion of the vehicle; and
said steering system is further provided with a support member connected to the vehicle body for supporting an inner end portion of said lower arm and said auxiliary power means and said connecting rod.

14. In a vehicular steering system including a steering wheel, right and left front wheels, a front wheel steering mechanism, right and left rear wheels and a rear wheel steering mechanism, with both said front wheels and said rear wheels being steered by said steering mechanisms by operation of said steering wheel, the improvement comprising;
- a front wheel steering system which connects said steering wheel with said front wheels through said front wheel steering mechanism;
- a connection path which connects said front wheel steering mechanism with said rear wheel steering mechanism;
- a rear wheel steering system which connects said steering wheel with said rear wheels through said connection path and said rear wheel steering mechanism;
- an auxiliary power means connected to said connection path for assisting said steering wheel in steering operation;
- said front wheel steering system being provided with a pinion portion, with a compression means being attached to said pinion portion;
- said front wheel steering mechanism comprising a pair of right and left knuckle arms for supporting said right and left front wheels, a pair of right and left tie rods connected to said knuckle arms, and a rack rod having a rack portion and connected at the end portions thereof to said right and left tie rods;
- said connection path including a pinion portion, with a compression means being attached to said pinion portion; and
- said pinion portion of said front wheel steering system and said pinion portion of said connection path are engaged with said rack portion of said front wheel steering mechanism through said compression means.

15. A vehicular steering wheel according to claim 14, wherein the axis of said pinion portion of said front steering system and the axis of said pinion portion of said connection path are relatively disposed at a predetermined angle.

16. A vehicular steering system according to claim 15, wherein:
said angle defined between the axis of said pinion portion of said front wheel steering system and the axis of said pinion portion of said connection path is substantially 90 degrees.

17. In a vehicular steering system including a steering wheel, right and left front wheels, a front wheel steering mechanism, right and left rear wheels and a rear wheel steering mechanism, with both said front wheels and said rear wheels being steered by said steering mechanisms by operation of said steering wheel, the improvement comprising;
- a front wheel steering system which connects said steering wheel with said front wheels through said front wheel steering mechanism;
- a connection path which connects said front wheel steering mechanism with said rear wheel steering mechanism;
- a rear wheel steering system which connects said steering wheel with said rear wheels through said connection path and said rear wheel steering mechanism;
- an auxiliary power means connected to said connection path for assisting said steering wheel in steering operation;
- said connection path including a pivotable operating shaft which extends in substantially the longitudinal direction of the vehicle body, with universal joints being attached to the end portions of said operating shaft; and
- said operating shaft being disposed outside the interior of the vehicle, with a cover member being fitted over the outer periphery of said operating shaft.

18. A vehicular steering system according to claim 17, wherein said operating shaft is disposed below a floor constituting member which constitutes the floor of the vehicle.

19. In a vehicular steering system including a steering wheel, right and left front wheels, a front wheel steering mechanism, right and left rear wheels and a rear wheel steering mechanism, with both said front wheels and said rear wheels being steered by said steering mechanisms by operation of said steering wheel, the improvement comprising;
- a front wheel steering system which connects said steering wheel with said front wheels through said front wheel steering mechanism;
- a connection path which connects said front wheel steering mechanism with said rear wheel steering mechanism;
- a rear wheel steering system which connects said steering wheel with said rear wheels through said connection path and said rear wheel steering mechanism;
- an auxiliary power means connected to said connection path for assisting said steering wheel in steering operation;
- said connection path including a pivotable operating shaft which extends in substantially the longitudinal direction of the vehicle body, with universal joints being attached to the end portions of said operating shaft; and
- said connection path being disposed above a lower member which is mounted on the lower portion of said vehicle body, said lower member serving as a protective member for said connection path.

20. A vehicular steering system according to claim 19, wherein said protective member comprises an exhaust pipe.

21. A vehicular steering system according to claim 19, wherein said protective membver comprises a fuel tank.

22. A vehicular steering system according to claim 19, wherein said protective member comprises an exhaust pipe and a fuel tank.

* * * * *